United States Patent
Xu et al.

(10) Patent No.: US 12,261,493 B2
(45) Date of Patent: Mar. 25, 2025

(54) MOTOR, COMPRESSOR, AND REFRIGERATION DEVICE

(71) Applicant: ANHUI MEIZHI PRECISION MANUFACTURING CO., LTD., Anhui (CN)

(72) Inventors: Fei Xu, Anhui (CN); Xiaohua Qiu, Anhui (CN); Bo Jiang, Anhui (CN)

(73) Assignee: ANHUI MEIZHI PRECISION MANUFACTURING CO., LTD., Anhui (CN)

( * ) Notice: Subject to any disclaimer, the term of this patent is extended or adjusted under 35 U.S.C. 154(b) by 576 days.

(21) Appl. No.: 17/532,391

(22) Filed: Nov. 22, 2021

(65) Prior Publication Data
US 2022/0085708 A1    Mar. 17, 2022

Related U.S. Application Data

(63) Continuation of application No. PCT/CN2019/124591, filed on Dec. 11, 2019.

(51) Int. Cl.
| | |
|---|---|
| *H02K 21/14* | (2006.01) |
| *F25B 31/02* | (2006.01) |
| *H02K 1/276* | (2022.01) |

(52) U.S. Cl.
CPC .......... *H02K 21/14* (2013.01); *F25B 31/026* (2013.01); *H02K 1/2766* (2013.01); *H02K 2201/03* (2013.01); *H02K 2213/03* (2013.01)

(58) Field of Classification Search
CPC .... F25B 31/026; H02K 1/2766; H02K 21/14; H02K 2201/03; H02K 2213/03; H02K 7/14
(Continued)

(56) References Cited

U.S. PATENT DOCUMENTS

| | | | |
|---|---|---|---|
| 6,533,558 B1 * | 3/2003 | Matsumoto | H02K 1/146 417/410.3 |
| 9,866,080 B2 * | 1/2018 | Kim | H02K 1/278 |

(Continued)

FOREIGN PATENT DOCUMENTS

| | | | | |
|---|---|---|---|---|
| CN | 101560977 A | 10/2009 | | |
| CN | 1940291 B | * 4/2011 | | F04B 35/04 |

(Continued)

OTHER PUBLICATIONS

Translation of foreign document CN 1940291 B (Year: 2011).*
(Continued)

*Primary Examiner* — Alex W Mok
(74) *Attorney, Agent, or Firm* — Scully, Scott, Murphy & Presser, P.C.

(57) ABSTRACT

A motor, a compressor and a refrigeration device are provided. The motor has a stator, a plurality of coil sets and a rotor. The stator has multiple stator teeth arranged along a peripheral direction. Every two adjacent stator teeth define a stator groove. Each coil set has multiple coils wound on the stator teeth. Each coil bypasses a corresponding stator tooth. The rotor is arranged inside the stator and has a rotor core and multiple permanent magnets. The rotor core has multiple slots. The slots are distributed circumferentially around a rotation center line of the rotor core. The permanent magnets are arranged in the slots.

24 Claims, 12 Drawing Sheets

(58) Field of Classification Search
USPC .................................................. 310/156.56
See application file for complete search history.

(56) References Cited

U.S. PATENT DOCUMENTS

| | | | |
|---|---|---|---|
| 2008/0224558 A1* | 9/2008 | Ionel | H02K 1/2766 310/156.57 |
| 2010/0156234 A1* | 6/2010 | Hoemann | H02K 1/276 310/216.106 |
| 2017/0047802 A1* | 2/2017 | Yabe | H02K 1/32 |
| 2017/0104399 A1* | 4/2017 | Yoon | F04C 29/02 |
| 2017/0117762 A1 | 4/2017 | Takahata et al. | |
| 2018/0076676 A1 | 3/2018 | Chen et al. | |
| 2019/0078563 A1 | 3/2019 | Jeong | |
| 2019/0348876 A1 | 11/2019 | Chiu et al. | |

FOREIGN PATENT DOCUMENTS

| | | | | |
|---|---|---|---|---|
| CN | 101560977 | B | | 12/2011 |
| CN | 204118885 | U | | 1/2015 |
| CN | 104901456 | A | | 9/2015 |
| CN | 105375657 | A | | 3/2016 |
| CN | 106026447 | A | * | 10/2016 ............ H02K 1/146 |
| CN | 106533008 | A | | 3/2017 |
| CN | 108616177 | A | | 10/2018 |
| CN | 109104012 | A | | 12/2018 |
| CN | 208209654 | U | | 12/2018 |
| CN | 109923757 | A | | 6/2019 |
| JP | 2001037186 | A | | 2/2001 |
| JP | 2005086955 | A | | 3/2005 |
| JP | 2008245384 | A | | 10/2008 |
| JP | 2009106001 | A | | 5/2009 |
| JP | 2011078283 | A | | 4/2011 |
| JP | 2012060799 | A | | 3/2012 |
| JP | 2015122936 | A | | 7/2015 |
| JP | 2015171272 | A | | 9/2015 |
| JP | 2015208053 | A | | 11/2015 |
| JP | 2019186972 | A | | 10/2019 |
| KR | 100921468 | B1 | * | 10/2009 |
| WO | 2017072967 | A1 | | 5/2017 |
| WO | 2019184392 | A1 | | 10/2019 |
| WO | 2019198138 | A1 | | 10/2019 |

OTHER PUBLICATIONS

Notice of Final Rejection dated Jan. 29, 2024 received in Korean Patent Application No. KR 10-2021-7039035.
International Search Report dated Aug. 27, 2020 issued in PCT/CN2019/124591.
First Office Action of Chinese Patent Application No. 201911267024.2 dated Apr. 21, 2021.
Second Office Action of Chinese Patent Application No. 201911267024.2 dated Oct. 18, 2021.
First Search of Chinese Patent Application No. 201911267024.2 dated Apr. 12, 2021.
Supplementary Search of Chinese Patent Application No. 201911267024.2 dated Oct. 11, 2021.
Notice of Reasons for Refusal dated Nov. 29, 2022 received in Japanese Patent Application No. JP 2021-571616.
Decision of Refusal dated May 23, 2023 received in Japanese Patent Application No. JP 2021-571616.
Notice to Submit Comments dated Jul. 10, 2023 received in Korean Patent Application No. KR 9-5-2023-062830651.
Supplementary European Search Report dated Jul. 19, 2022 received in European Patent Application No. EP 19955683.8.
Office Action dated Sep. 25, 2024 received in European Patent Application No. 19 955 683.8.

* cited by examiner

MOTOR, COMPRESSOR, AND REFRIGERATION DEVICE

CROSS-REFERENCE TO RELATED APPLICATION

The present application is a continuation application of PCT International Application No. PCT/CN2019/124591, filed on Dec. 11, 2019, the entire content of which is herein incorporated by reference for all purposes. No new matter has been introduced.

FIELD

The present disclosure relates to the technical field of refrigeration device, and more particularly relates to a motor, a compressor, and a refrigeration device.

BACKGROUND

In existing rotary DC variable-frequency compressors using motors, built-in permanent-magnet motors are widely used. For rotors of the built-in permanent-magnet motors, harmonics of an air-gap magnetic field are very rich, and the mass is small, so loud vibration noise is likely to be produced.

SUMMARY

The present disclosure aims to solve one or more technical problems in the prior art or conventional technologies.

A first aspect of the present disclosure provides a motor.

A second aspect of the present disclosure provides a compressor.

A third aspect of the present disclosure provides refrigeration device.

According to the first aspect of the present disclosure, a motor is provided, which includes: a stator, wherein the stator is provided with a plurality of stator teeth arranged along a peripheral direction, and two adjacent stator teeth define a stator groove; a plurality of coil sets, wherein each coil set includes a plurality of coils wound on the stator teeth, and each coil correspondingly bypasses one corresponding stator tooth; and a rotor arranged inside the stator, wherein the rotor includes a rotor core and a plurality of permanent magnets, the rotor core is provided with a plurality of slots, the plurality of slots are distributed circumferentially around a rotation center line of the rotor core, and the plurality of permanent magnets are arranged in the plurality of slots; the remanence Br of each permanent magnet at 20° C. satisfies: Br≥1.2 T; and an inner diameter $\Phi si$ of the stator and an outer diameter $\Phi so$ of the stator satisfy: $0.558 \leq \Phi si/\Phi so \leq 0.576$.

The motor provided by the present disclosure includes the stator and the rotor, wherein the stator is arranged on the periphery of the rotor, and the stator is provided with a plurality of stator teeth arranged along the peripheral direction, and two adjacent stator teeth define the stator groove. The motor also includes a plurality of coil sets, wherein each coil set includes a plurality of coils wound on the stator teeth, and each coil correspondingly bypasses one corresponding stator tooth. The rotor includes the rotor core and a plurality of permanent magnets, and the rotor core is provided with a plurality of slots, so that the plurality of slots are distributed circumferentially around the rotation center line of the rotor core; and moreover, the plurality of permanent magnets are arranged in the plurality of slots, so that the rotor generates a magnetic field in the circumferential direction. The rotor is matched with the stator, which is conducive to ensuring the stability of electromagnetic waveforms of an air-gap magnetic field, and reducing the running noise of the motor. Moreover, the remanence Br of each permanent magnet at 20° C. is greater than or equal to 1.2 T, which is conducive to shortening the magnet saturation time, and making the harmonics of the air-gap magnetic field stable rapidly, thereby reducing the noise. Furthermore, a ratio of the inner diameter $\Phi si$ of the stator to the outer diameter $\Phi so$ of the rotor is enabled to be greater than or equal to 0.558 and less than or equal to 0.576, so that on one hand, it can be ensured that the stator teeth have sufficient length so as to wind sufficient windings, realize the efficient cooperation of the stator and the rotor, and ensure the stability of the electromagnetic waveforms of the air-gap magnetic field; and on the other hand, a yoke of the stator may have sufficient thickness to ensure the performance of the motor, so that the motor has improved cost performance and good performance, and the vibration noise is small, thereby enabling the vibration noise of a compressor shaft system connected thereto to be small too, and improving the user experience. For example, $\Phi si/\Phi so$ is 0.56 or 0.57.

In a case where the periphery of the stator is not regularly cylindrical, but partially concave or convex, the outer diameter $\Phi so$ of the stator refers to the diameter of the periphery of the regularly-cylindrical stator by default. The unit of the inner diameter $\Phi si$ of the stator and the outer diameter $\Phi so$ of the stator is mm.

Furthermore, the motor according to the embodiment provided by the present disclosure may also have the following additional technical features:

In a possible design, a gap g between the stator and the rotor and the outer diameter $\Phi r$ of the rotor satisfy: $180 \leq \Phi r/g^2 \leq 240$.

In the design, by setting the ratio of the outer diameter $\Phi r$ of the rotor to the square of the gap g between the stator and the rotor to be 180-240, it can be ensured that when the outer diameter $\Phi r$ of the rotor is large, the gap g between the stator and the rotor is large enough, so that on the one hand, it is conducive to increasing the mass of the rotor, changing the intrinsic frequency of the rotor, avoiding the problem of loud vibration noise of the shaft system caused by the light mass of the rotor, facilitating the reduction of the running noise of the motor and the compressor, improving the user experience, and significantly improving the audio impression of apparatus such as an air conditioner external unit; and on the other hand, the interference between the rotor and the stator may be avoided effectively, the overall size of the motor is unnecessary to increase excessively, and the performance of the motor is ensured. Particularly, in a case where the ratio of the inner diameter $\Phi si$ of the stator to the outer diameter $\Phi so$ of the stator is greater than or equal to 0.558 and less than or equal to 0.576, while the mass of the rotor is increased, the stator may have sufficient internal space to accommodate the rotor; and moreover, the size of the stator may not be increased excessively.

For example, when the gap g between the stator and the rotor is 0.5 mm, $221 \leq \Phi r/g^2 \leq 230$; when the gap g between the stator and the rotor is 0.51 mm, $212 \leq \Phi r/g^2 \leq 221$; when the gap g between the stator and the rotor is 0.52 mm, $204 \leq \Phi r/g^2 \leq 212$; when the gap g between the stator and the rotor is 0.53 mm, $200 \leq \Phi r/g^2 \leq 204$; when the gap g between the stator and the rotor is 0.54 mm, $190 \leq \Phi r/g^2 \leq 200$; when the gap g between the stator and the rotor is 0.55 mm, $180 \leq \Phi r/g^2 \leq 190$.

Wherein, the unit of the outer diameter $\Phi r$ of the rotor is millimeter, i.e. mm, and the unit of the gap g between the stator and the rotor is mm. g refers to any gap between the stator and the rotor or represents a minimum gap between the two.

Further, the gap g between the stator and the rotor is negatively correlated with $\Phi r/g^2$. The larger the gap g between the stator and the rotor, the smaller the $\Phi r/g^2$.

In a possible design, the rotational inertia J of the rotor, the gap g between the stator and the rotor, the mass m of the rotor and the outer diameter $\Phi r$ of the rotor satisfy: $230 \leq J/g^2 \leq 340$, and $J=0.5\ m \times \Phi r^2$.

In the design, by setting the ratio of the rotational inertia J of the rotor to the square of the gap g between the stator and the rotor to be between 280 and 340, and defining that the rotational inertia J of the rotor is equal to 0.5 times the mass of the rotor multiplied by the square of the outer diameter $\Phi r$ of the rotor, the mass m of the rotor is defined further by the relation between the rotational inertia and the gap g between the stator and the rotor. The mass of the rotor may be the mass of the rotor core after all permanent magnets are inserted. The rotational inertia J of the rotor, the gap g between the stator and the rotor, the mass m of the rotor and the outer diameter $\Phi r$ of the rotor are related to one another, and the range of combined variables is $230 \leq J/g^2 \leq 340$, which may increase the mass of the rotor, reduce the running noise of the compressor, improve the running efficiency of the motor and ensure the performance of the motor. For example, $J/g^2$ is 280, 320 or 340. The unit of the rotational inertia J of the rotor is $kg \cdot m^2$.

For example, when the gap g between the stator and the rotor is 0.5 mm, $288 \leq J/g^2 \leq 340$; when the gap g between the stator and the rotor is 0.51 mm, $277 \leq J/g^2 \leq 318$; when the gap g between the stator and the rotor is 0.52 mm, $266 \leq J/g^2 \leq 306$; when the gap g between the stator and the rotor is 0.53 mm, $256 \leq J/g^2 \leq 294$; when the gap g between the stator and the rotor is 0.54 mm, $247 \leq J/g^2 \leq 284$; when the gap g between the stator and the rotor is 0.55 mm, $230 \leq J/g^2 \leq 273$.

Further, the gap g between the stator and the rotor is negatively correlated with $J/g^2$. The larger the gap g between the stator and the rotor, the smaller the $J/g^2$.

In a possible design, the gap g between the stator and the rotor satisfies: $0.5\ mm \leq g \leq 0.55\ mm$.

In the design, the gap g between the stator and the rotor is greater than or equal to 0.5 mm and less than or equal to 0.55 mm, so that on the one hand, it is beneficial for the stable rotation of the rotor in the stator without collision; and on the other hand, it is beneficial for the rotor to have sufficient size and weight to avoid the problem of loud vibration noise of the shaft system caused by the small mass of the rotor, thereby reducing the running noise of the motor and the compressor. In a case where the inner diameter $\Phi si$ and the outer diameter $\Phi so$ of the stator satisfy: $0.558 \leq \Phi si/\Phi so \leq 0.576$, and/or the gap g between the stator and the rotor and the outer diameter $\Phi r$ of the rotor satisfy: $180 \leq \Phi r/g2 \leq 240$, and/or the rotational inertia J of the rotor, the gap g between the stator and the rotor, the mass m of the rotor and the outer diameter $\Phi r$ of the rotor satisfy: $230 \leq J/g^2 \leq 340$, and $J=0.5\ m \times \Phi r^2$, and the motor performance may be ensured, the weight of the rotor is better increased, thereby reducing the vibration noise of the motor.

In a possible design, the plurality of slots are distributed circumferentially around the rotation center line of the rotor, a connecting line between the midpoint of each slot and the rotation center line of the rotor is a d axis, and the d axis is a straight line; and two permanent magnets distributed at two sides of the d axis are arranged in each slot, and the two permanent magnets are distributed in a V shape.

In the design, the plurality of slots are arranged circumferentially around the rotation center line of the rotor, so that the plurality of permanent magnets are also distributed circumferentially around the rotation center line of the rotor, which is conducive to ensuring the running stability of the motor. Furthermore, the connecting line between the midpoint of each slot and the rotation center line of the rotor is the d axis, and the d axis is the straight line and the connecting line representing a distance between the midpoint and the rotation center line of the rotor. The midpoint is located on an axisymmetric plane of the slot. Two permanent magnets are arranged in each slot, the two permanent magnets are distributed at two sides of the d axis and distributed in a V shape, that is, in any cross section of the rotor, extension lines of long sides of the two permanent magnets are not overlapped but intersected at one point, which is conducive to increasing a back electromagnetic force of the motor, improving the harmonics of the air-gap magnetic field and reducing the noise generated thereby.

Further, an angle of the two permanent magnets is ranged from 110° to 150°. That is, on any cross section of the rotor, portions of each slot at two sides of the d axis form an angle between 110° and 150°, the harmonics of the air-gap magnetic field are stable, the noise reduction effect is good, the back electromagnetic force is high, a cooperation effect with tooth crowns of stator teeth is good, and the motor performance is good. For example, the angle of the two permanent magnets is 110°, 130° or 150°.

In a possible design, on any cross section of the rotor, a length of a slot wall of a half slot divided by the d axis is Wn, a length of the permanent magnet is Wm, and a difference between Wm and Wn is denoted as W1, wherein $0 < W1/Wm \leq 0.5$.

In the design, on any cross section of the rotor, the length of the slot wall of the half slot divided by the d axis is shorter than the length of the permanent magnet by W1, a ratio of W1 to Wm is designed to be greater than 0 and less than or equal to 0.5, so that the power density of the motor is increased.

Wn here is the length of the slot wall fit to the permanent magnet by default. In order to ensure that the permanent magnet is arranged in the slot, the side wall of the slot is partially missing, for example, recessed or protruded and is not fit to the permanent magnet, so that the permanent magnet is inserted into the slot.

In a possible design, each slot is provided with a retaining rib on the position of the d axis, and the slot is divided by the retaining rib into two independent chambers; and/or each slot is provided with a clamping bulge on the position of the d axis, and the clamping bulge extends into the slot and extends in a direction away from the rotation center line of the rotor.

In the design, the inner wall of each slot is provided with the retaining rib on the position of the d axis, and the slot is divided by the retaining rib into two independent chambers, thereby facilitating the alignment and installation of the permanent magnet. Furthermore, each slot is provided with the clamping bulge on the position of the d axis, so that the position of the permanent magnet is limited by the clamping bulge, and the permanent magnet is ensured to be installed in place and to be inserted into the rotor core stably. At the same time, the retaining ribs can enhance the mechanical strength of the rotor to prevent the plastic deformation of the punches of the rotor when the motor rotates at high speed.

In a possible design, the rotor also includes a plurality of magnetic flux guide grooves. On any cross section of the rotor, the plurality of magnetic flux guide grooves are located between the plurality of slots and the peripheral wall of the rotor core.

In the design, the rotor core is provided with a plurality of magnetic flux guide grooves; for example, on any cross section of the rotor, the plurality of magnetic flux guide grooves are arranged between the plurality of slots and the peripheral wall of the rotor core, and located between the plurality of permanent magnets and the coils on the stator teeth, so that a harmonics magnetic field of an armature magnetic field may be adjusted, and the electromagnetic waveforms of the air-gap magnetic field may be improved, thereby reducing the noise, and reducing the loss of armature iron.

Further, the magnetic flux guide grooves pass through the rotor core along an extension direction of the rotation center line of the rotor.

Further, on any cross section of the rotor, a contour line of each magnetic flux guide groove is enclosed by a plurality of curves and/or a plurality of straight lines. The cross section of the magnetic flux guide groove may be in a rectangular shape, a sector-ring shape or a runway shape.

In a possible design, the plurality of magnetic flux guide grooves are divided into a plurality of groups of guide grooves, and the magnetic flux guide grooves located between one slot and the peripheral wall of the rotor core form one group of guide grooves; and each group of guide grooves includes a first magnetic flux guide groove and a second magnetic flux guide groove. In a case where one stator tooth is opposite to the middle portion of one slot, a plane where one side wall in the width direction of the stator tooth is located is used to separate the first magnetic flux guide groove and the second magnetic flux guide groove.

In the design, the plurality of magnetic flux guide grooves are divided into a plurality of groups of guide grooves, and the magnetic flux guide grooves located between one slot and the peripheral wall of the rotor core are used as one group of guide grooves. Each group of guide grooves includes at least two magnetic flux guide grooves, for example, includes the first magnetic flux guide groove and the second magnetic flux guide groove, so that the electromagnetic waves of the armature magnetic field can be adjusted effectively, thereby improving the electromagnetic waveforms of the air-gap magnetic field, reducing the noise, and reducing the loss of the iron core. Of course, in other designs, each group of guide grooves may also include a third magnetic flux guide groove.

Furthermore, in a case where the stator tooth is opposite to the middle portion of the slot, that is, in a case where one stator tooth rotates to be right opposite to the middle portion of one slot, or one stator tooth is right opposite to the middle portion of one slot after stopping rotating, the plane where one side wall in the width direction of the stator tooth is located can separate the first magnetic flux guide groove and the second magnetic flux guide groove, that is, the first magnetic flux guide groove and the second magnetic flux guide groove are located at two sides of the plane, so that on one hand, a certain distance between the first magnetic flux guide groove and the second magnetic flux guide groove can be ensured, thereby facilitating the machining of the magnetic flux guide groove and avoiding the deformation of the rotor punches; and on the other hand, after the coil on the stator tooth is electrified, the effect for weakening the harmonics magnetic field acting on the rotor is better, so that the running efficiency of the motor is improved, and the noise reduction effect is improved.

For example, in a case where each group of guide grooves includes two first magnetic flux guide grooves and two second magnetic flux guide grooves, the planes where both side surfaces in the width direction of the stator tooth are located can separate the first magnetic flux guide grooves and the second magnetic flux guide grooves, and then the two second magnetic flux guide grooves are located between the two first magnetic flux guide grooves, so that two second magnetic flux guide grooves with complete contours are clamped between the planes where the two side surfaces in the width direction of the stator tooth are located.

In a possible design, on any cross section of the rotor, the width of the magnetic flux guide groove is changed in the radial direction of the rotor core; and/or on any cross section of the rotor, the widths of the first magnetic flux guide groove and the second magnetic flux guide groove are different at equal distances from the rotation center line of the rotor. The penetration depth of the armature magnetic field on the surface of the rotor may be different, which is more conducive to weakening the armature magnetic field, so that the air-gap magnetic field is more stable, and the noise is reduced.

In a possible design, in each group of guide grooves, the number of first magnetic flux guide grooves is two, and the number of second magnetic flux guide grooves is two; and the two first magnetic flux guide grooves are located between the two second magnetic flux guide grooves.

In the design, by setting the number of the magnetic flux guide grooves located between one slot and the peripheral wall of the rotor core to be four, and symmetrically distributing different magnetic flux guide grooves, the fundamental amplitude of the back electromagnetic force can be increased, the copper loss is reduced, the sinusoidal degree of the waveform of the air-gap magnetic field is better, the noise is reduced, the armature magnetic field is weakened, and the iron loss is reduced.

In a possible design, on any cross section of the rotor, a connecting line between midpoints of two ends in the length direction of the magnetic flux guide groove is a directional line of the magnetic flux guide groove, and the directional line is a straight line. An extension line of the directional line of the first magnetic flux guide groove and an extension line of the directional line of the second magnetic flux guide groove have an intersection point, and the intersection point deviates from the d axis at the slot corresponding to the group of guide grooves.

In the design, by setting that on any cross section of the rotor, the connecting line between midpoints of the two ends in the length direction of the magnetic flux guide groove is the directional line of the magnetic flux guide groove, that is, the two midpoints are connected, and the line representing the distance between the two is the directional line of the magnetic flux guide groove. The extension line of the directional line of the first magnetic flux guide groove and the extension line of the directional line of the second magnetic flux guide groove have the intersection point, and the intersection point deviates from the d axis at the slot corresponding to the group of guide grooves, so that the electromagnetic waves of the armature magnetic field can be inhibited effectively, thereby improving the electromagnetic waveforms of the air-gap magnetic field, reducing the noise, and reducing the iron loss.

In a possible design, on any cross section of the rotor, the extension line of the directional line of the first magnetic flux guide groove and the extension line of the directional line of the second magnetic flux guide groove form an angle δ, and δ is an acute angle and satisfies: 3°<δ≤20°. The harmonics of the armature magnetic field can be inhibited effectively, thereby improving the electromagnetic waveforms of the air-gap magnetic field, and reducing the noise. According to certain embodiments, δ is 5°, 12° or 20°.

In a possible design, on any cross section of the rotor, an angle α1 between the contour line of slot facing the first magnetic flux guide groove and the directional line of the first magnetic flux guide groove and an angle α2 between the contour line of the slot facing the second magnetic flux guide groove and the directional line of the second magnetic flux guide groove satisfy: a sum of the angle α1 and the angle α2 is greater than 180°. An effective value of the back electromagnetic force can be maximized, the copper loss can be reduced, the harmonics of the armature magnetic field can be inhibited, the electromagnetic waveforms of the air-gap magnetic field can be improved, the noise can be reduced, and the iron loss can be reduced. According to certain embodiments, the sum of α1 and α2 is 200° or 250°.

Further, when 1<α2/α1≤1.1, the armature iron loss can be inhibited, the waveforms of the air-gap magnetic field are also improved, the running noise of the compressor is reduced effectively, and the low and medium frequency energy efficiency of the compressor is improved. According to certain embodiments, α2/α1 is 1.01, 1.05 or 1.1.

Further, when 90°<α1<120°, the waveforms of the air-gap magnetic field can be improved, the armature iron loss is reduced effectively, and the low and medium frequency energy efficiency of the compressor is improved. According to certain embodiments, α1 is 100°, 110° or 120°.

Further, when 90°<α2<130°, the armature iron loss can be inhibited, the back electromagnetic force is increased, and the low-frequency energy efficiency of the compressor is increased. According to certain embodiments, α2 is 110°, 120° or 125°.

In a possible design, on any cross section of the rotor, a magnetic isolation bridge is formed between the end of at least one slot far from the rotation center line of the rotor and the peripheral wall of the rotor core. A distance B between the magnetic flux guide groove and the slot and the thickness Tb of the magnetic isolation bridge satisfy: B<Tb. Therefore, while the magnetic flux is maximized, the armature action is inhibited, the running efficiency of the motor is increased, and the motor performance is improved.

The end of the slot away from the d axis of the rotor forms a non-magnetic gap, and the magnetic isolation bridge is located at one side of the gap away from the d axis of the slot. Tb refers to the thickness of any position of the magnetic isolation bridge, or Tb refers to a minimum thickness of the magnetic isolation bridge.

According to the second aspect of the present disclosure, a compressor is provided, which includes: a crankshaft, a first air cylinder; and the motor of any one of the above embodiments, wherein the rotor of the motor is sleeved on the crankshaft, and the air cylinder is located at one side of the rotor.

The compressor provided by the present disclosure has the motor of any one of the embodiments, thereby having the beneficial effects of any one of the above embodiments, which are not repeated here.

In a possible design, a distance L1 between the end surface of the first air cylinder away from the rotor and the end surface of the rotor core away from the first air cylinder and the outer diameter Φr of the rotor satisfy: 1.91≤L1/Φr≤2.11.

In the design, by setting a ratio of the distance L1 between the end surface of the first air cylinder away from the rotor and the end surface of the rotor core away from the first air cylinder to the outer diameter Φr of the rotor to be 1.91-2.11, a shaft system of the compressor can reach the proper stiffness, and the running stability of the shaft system of the compressor is improved, thereby reducing the running noise. The shaft system of the compressor includes the rotor, the crankshaft and the air cylinder of the compressor. According to certain embodiments, L1/Φr is 1.93, 1.95 or 2.10.

In a possible design, the distance L1 between the end surface of the first air cylinder away from the rotor and the end surface of the rotor core away from the first air cylinder, the inner diameter Φsi of the stator and the outer diameter Φso of the stator satisfy: 191≤L1/(Φsi/Φso)≤211.

In the design, by defining that the distance L1 between the end surface of the first cylinder far away from the rotor and the end surface of the rotor core far away from the first cylinder, the inner diameter Φsi of the stator and the outer diameter Φso of the stator are interrelated, and the value range of combined variables satisfies: ≤L1/(Φsi/Φso)≤211, the shaft system of the compressor can reach the proper stiffness, and the running stability of the shaft system of the compressor is improved, thereby reducing the running noise. Particularly in a case where the distance is also related to the outer diameter Φr of the rotor and satisfies: 1.91≤L1/Φr≤2.11, not only can the rotor have large size and heavy weight, but also the stiffness of the shaft system of the compressor can be improved, and the running noise of the compressor can be reduced effectively. According to certain embodiments, L1/(Φsi/Φso) is 192, 200 or 210.

In a possible design, the inner diameter Φ1 of a portion of the rotor matched with the crankshaft and the outer diameter Φr of the rotor satisfy: 3.8≤Φr/Φ1≤4.5.

In the design, the ratio of the outer diameter Φr of the rotor to the inner diameter Φ1 of the portion of the rotor matched with the crankshaft is between 3.8 and 4.5, so that the frictional loss of the compressor in the running process can be reduced effectively, the outer diameter of the rotor is small, the inner diameter Φ1 of the portion of the rotor matched with the crankshaft is small, and the diameter of the crankshaft located in the rotor is small, thereby facilitating the reduction of the frictional loss, and ensuring the running reliability of the motor. According to certain embodiments, Φr/Φ1 is 3.8, 4.0 or 4.5. Tolerance is ignored here. The diameter of the portion of the crankshaft of the compressor matched with the rotor is same with Φ1 by default.

Φ1 refers to the inner diameter of any portion of the rotor matched with the crankshaft, or the maximum inner diameter of the portion of the rotor matched with the crankshaft.

In a possible design, the compressor also includes a second air cylinder located at one side of the first air cylinder away from the rotor. The inner diameter Φ1 of the portion of the rotor matched with the crankshaft and the outer diameter Φr of the rotor satisfy: 3.4≤Φr/Φ1≤4.

In the design, in a case where the compressor is provided with two air cylinders, the ratio of the outer diameter Φr of the rotor to the inner diameter Φ1 of the portion of the rotor matched with the crankshaft is between 3.4 and 4, so that the frictional loss of the compressor in the running process can be reduced effectively, the outer diameter of the rotor is small, but the inner diameter Φ1 of the portion of the rotor matched with the crankshaft may not be too small, and the diameter of the crankshaft located in the rotor may not be small either, thereby reducing the frictional loss, and ensuring the running reliability of the motor. According to certain embodiments, Φr/Φ1 is 3.4, 3.8 or 4. Tolerance is ignored here. The diameter of the portion of the crankshaft of the compressor matched with the rotor is same with Φ1 by default.

Φ1 refers to the inner diameter of any portion of the rotor matched with the crankshaft, or the maximum inner diameter of the portion of the rotor matched with the crankshaft.

The third aspect of the present disclosure provides refrigeration device, which includes the compressor of any one of the above embodiments.

The refrigeration device provided by the present disclosure is provided by the compressor of any one of the above embodiments, thereby having the beneficial effects of any one of the above embodiments, which are not repeated here.

Further, the refrigeration device also includes a condenser, a depressurization member and an evaporator. An outlet of the compressor is communicated with an inlet of the condenser; an inlet of the depressurization member is communicated with an outlet of the condenser; and an inlet of the evaporator is communicated with an outlet of the depressurization member, and an outlet of the evaporator is communicated with an inlet of the compressor. The refrigeration and heating cycling is realized. The compressor has long service life, which is conducive to ensuring the service life of the refrigeration system.

Further, the refrigeration device is a refrigerator or an air conditioner.

Additional aspects and advantages of the present disclosure may become apparent in the following description or may be known by the practice of the present disclosure.

BRIEF DESCRIPTION OF THE DRAWINGS

The above and/or additional aspects and advantages of the present disclosure become apparent and easily understood from the following description of the embodiments in combination with the accompanying drawings.

Figure 1:
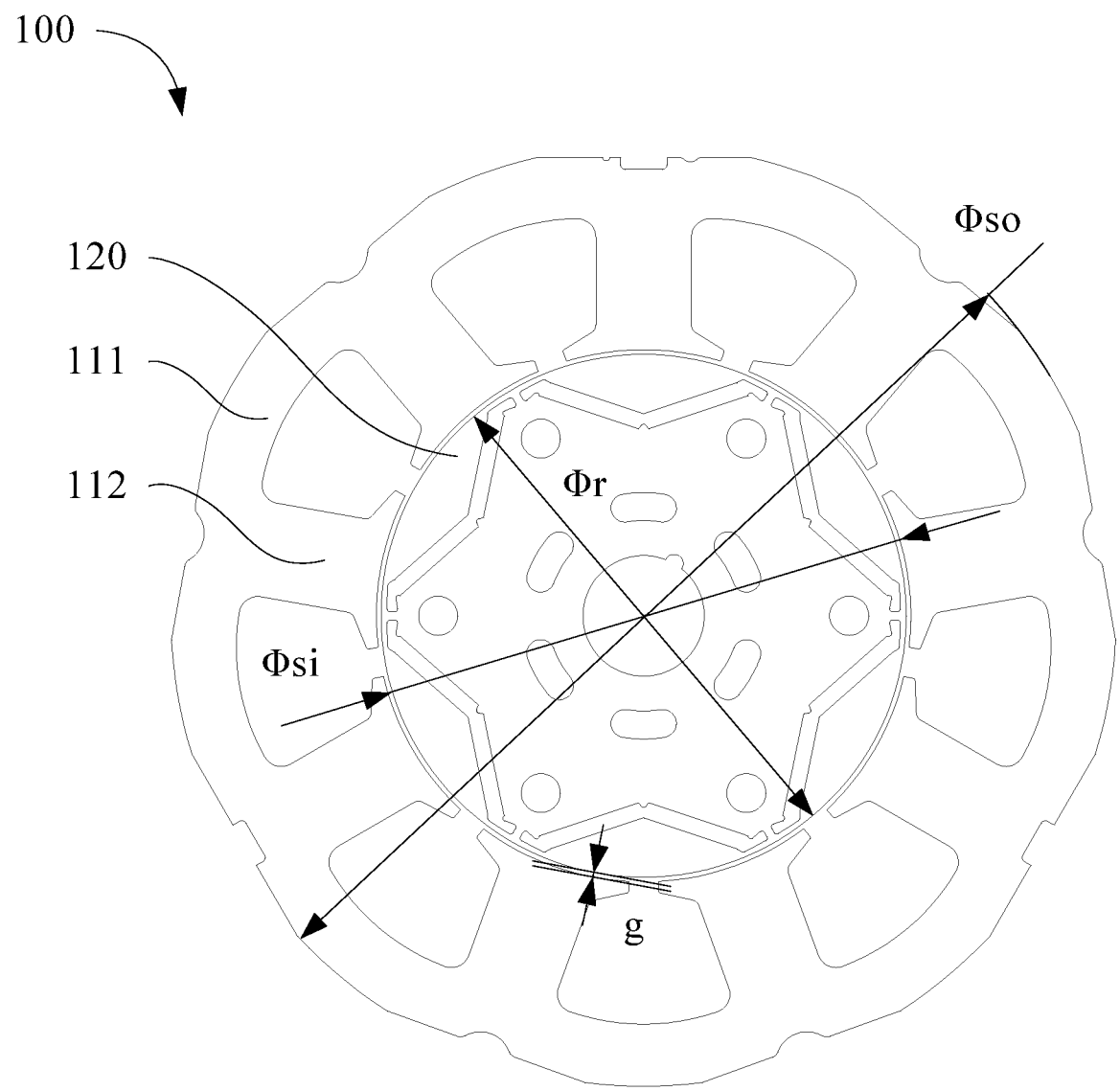
FIG. 1 illustrates a structural schematic diagram of a motor of an embodiment of the present disclosure.

Wherein the corresponding relationship between reference numerals and component names in FIGS. 1-17 is:

100 motor; 110 stator; 111 stator core; 112 stator tooth; 113 stator groove; 120 rotor; 121 rotor core; 122 permanent magnet; 123 slot; 124 retaining rib; 125 clamping bulge; 126 first magnetic flux guide groove; 127 second magnetic flux guide groove; 128 magnetic isolation bridge; 129 riveting hole; 200 compressor; 210 crankshaft; 212 first air cylinder; 214 second air cylinder.

DETAILED DESCRIPTION OF THE DISCLOSURE

In order that the above objects, features, and advantages of the present disclosure may be more clearly understood, the present disclosure will be described in further detail with reference to the accompanying drawings and preferred embodiments. It should be noted that the embodiments and features in the embodiments of the present disclosure may be combined with one another without conflict.

In the following description, many specific details are set forth in order to fully understand the present disclosure. However, the present disclosure can also be implemented in other ways different from those described herein. Therefore, the scope of the present disclosure is not limited by specific embodiments disclosed below.

Figure 2:
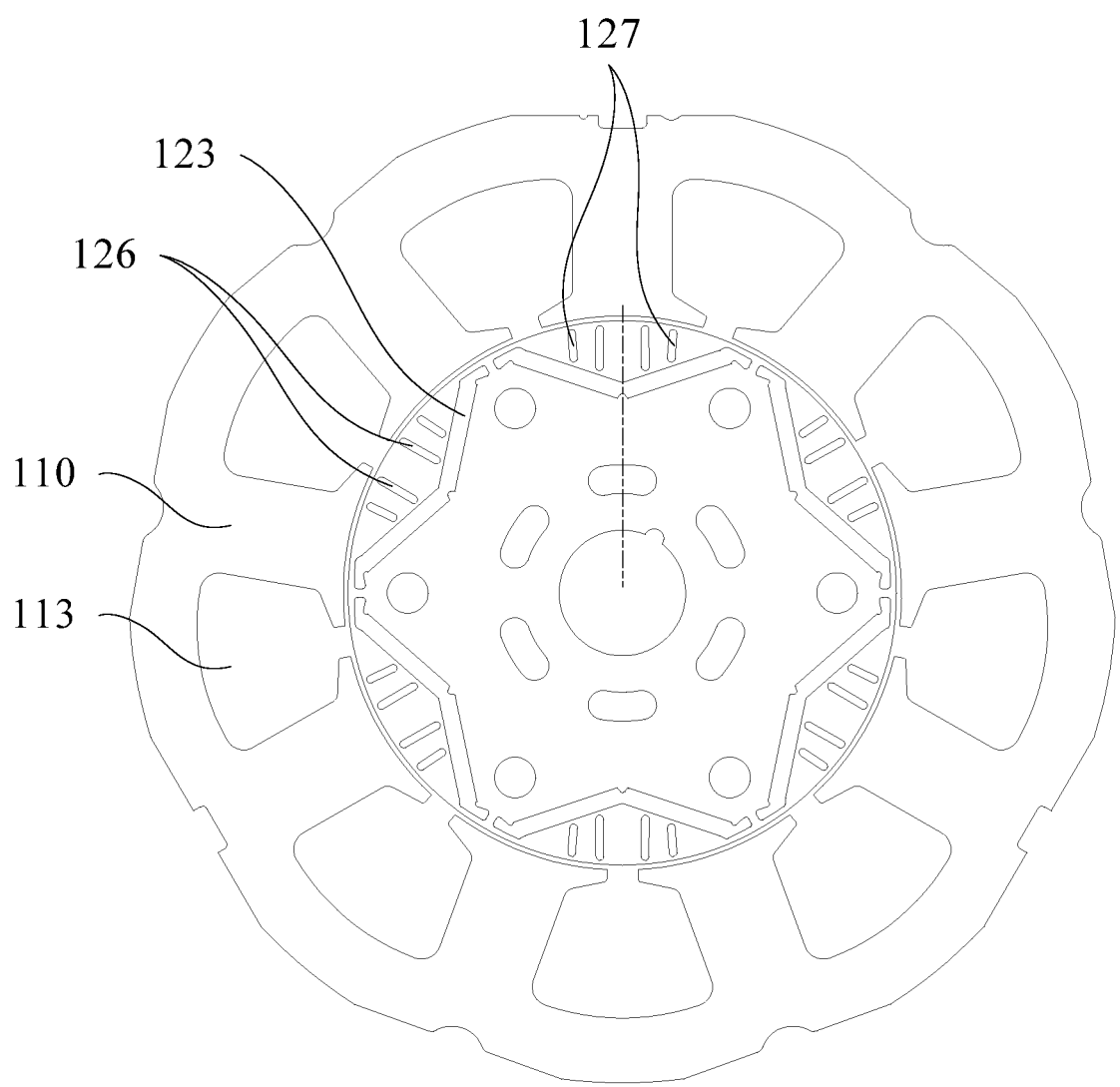
FIG. 2 illustrates another structural schematic diagram of the motor of an embodiment of the present disclosure.
Figure 3:
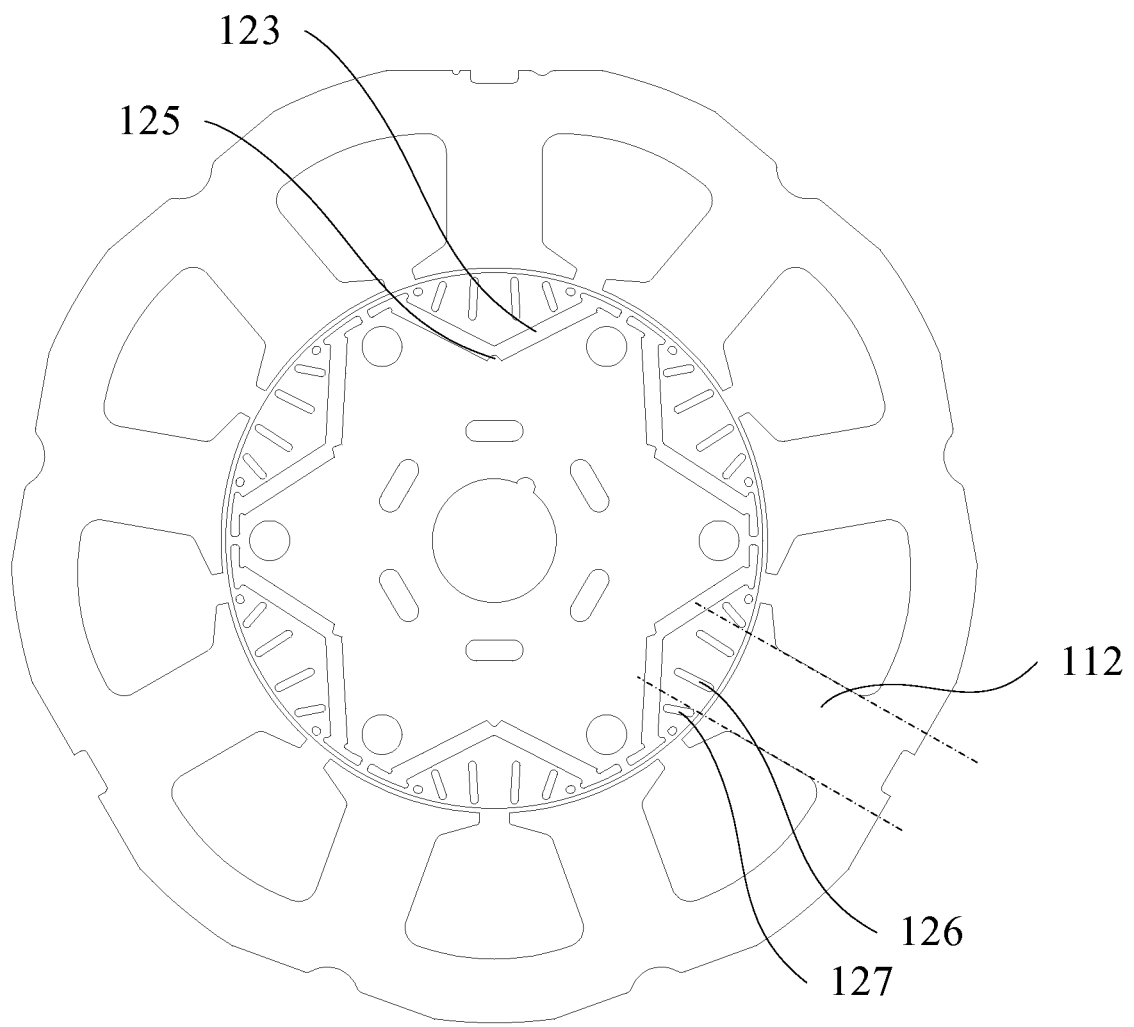
FIG. 3 illustrates another structural schematic diagram of the motor of an embodiment of the present disclosure.

A motor 100 and a compressor 200 according to some embodiments of the present disclosure are described below with reference to FIG. 1 to FIG. 18. A dotted line shown in FIG. 2 represents a d axis; the dotted line shown in FIG. 3 represents a plane where one side surface in a width direction of a stator tooth 112 is located; and the dotted line in a first magnetic flux guide groove 126 in FIG. 9 represents a directional line of the first magnetic flux guide groove 126, and the dotted line in a second magnetic flux guide groove 127 represents a directional line of the second magnetic flux guide groove 127.

According to the first aspect of the present disclosure, an embodiment provides a motor 100, exemplary examples of which are as follows.

Embodiment 1

As shown in FIG. 1 to FIG. 6, a motor 100 includes a stator 110 and a rotor 120. The stator 110 is arranged around the periphery of the rotor 120. The stator 110 includes a stator core 111. The stator core 111 includes a plurality of stator teeth 112. The plurality of stator teeth 112 are distributed circumferentially around the rotor 120. A stator groove 113 is formed between two adjacent stator teeth 112. A plurality of coils are wound on the plurality of stator teeth 112 through the stator grooves 113. The rotor 120 includes a rotor core 121 and a plurality of permanent magnets 122. The rotor core 121 is provided with a plurality of slots 123. The plurality of slots 123 are distributed circumferentially around a rotation center line of the rotor core 121. The plurality of permanent magnets 122 are arranged in the plurality of slots 123.

Further, the rotor core 121 is formed by a plurality of rotor punches. On the rotor core 121, fastening holes are provided on one side of each of a plurality of permanent magnets 122 facing the rotation center line of the rotor 120. The fastening holes pass through the rotor core 121 along an axial direction, so that the plurality of rotor punches are connected into a whole.

Further, both the rotor 120 and the stator 110 have an approximately-cylindrical peripheral surface.

Further, the motor 100 can be a permanent magnet synchronous motor. The permanent magnet 122 can be a rare-earth permanent magnet.

Further, the remanence Br of each permanent magnet 122 at 20° C. satisfies: Br≥1.2 T, which is conducive to shortening the magnetic saturation time, so that the harmonics of the air-gap magnetic field are stabilized rapidly, thereby reducing noise.

Further, a ratio of the inner diameter $\Phi si$ of the stator 110 to the outer diameter $\Phi so$ of the stator 110 is greater than or equal to 0.558 and less than or equal to 0.576. On one hand, it can be ensured that the stator tooth 112 has sufficient length to wind sufficient windings, thereby realizing the efficient cooperation between the stator 110 and the rotor 120; and on the other hand, a yoke of the stator 110 can have sufficient thickness to ensure the performance of the motor 100, so that the motor 100 has improved cost performance. The motor 100 has good performance and small vibration noise, so that the vibration noise of a shaft system of the compressor 200 connected with the motor is also small, thereby improving the user experience. According to certain embodiments, $\Phi si/\Phi so$ is 0.56 or 0.57.

In a case where the periphery of the stator 110 is not regularly cylindrical, but partially concave or convex, the outer diameter $\Phi so$ of the stator 110 refers to the diameter of the periphery of the regularly-cylindrical stator 110 by default. The unit of the inner diameter $\Phi si$ of the stator 110 and the outer diameter $\Phi so$ of the stator 110 is millimeter.

Embodiment 2

On the basis of Embodiment 1, as shown in FIG. 1, a gap g between the stator 110 and the rotor 120 and the outer diameter $\Phi r$ of the rotor 120 are further defined to satisfy: $180 \leq \Phi r/g^2 \leq 240$.

In the present embodiment, by setting the ratio of the outer diameter $\Phi r$ of the rotor 120 to the square of the gap g between the stator 110 and the rotor 120 to be 180-240, it can be ensured that while the outer diameter $\Phi r$ of the rotor 120 is large, the sufficient gap g is ensured to be provided between the stator 110 and the rotor 120, so that on the one hand, it is conducive to increasing the mass of the rotor 120, changing the intrinsic frequency of the rotor 120, avoiding the problem of loud vibration noise of the shaft system caused by the light mass of the rotor 120, facilitating the reduction of the running noise of the motor 100 and the compressor 200, improving the user experience, and significantly improving the audio impression of apparatus such as an air conditioner external unit; and on the other hand, the interference between the rotor 120 and the stator 110 can be avoided effectively, excessively increasing the overall size of the motor 100 is avoided, and the performance of the motor 100 is ensured. Particularly, in a case where the ratio of the inner diameter $\Phi si$ of the stator 110 to the outer diameter $\Phi so$ of the stator 110 is greater than or equal to 0.558 and less than or equal to 0.576, the mass of the rotor 120 is increased, and the stator 110 can also have sufficient space to accommodate the rotor 120; and moreover, excessive increase of the size of the stator 110 is avoided.

According to certain embodiments, $\Phi r/g^2$ is 180, 200 or 240. The unit of the outer diameter $\Phi r$ of the rotor 120 is millimeter, and the unit of the gap g between the stator 110 and the rotor 120 is millimeter. g refers to any gap between the stator 110 and the rotor 120 or represents a minimum gap between the two.

According to certain embodiments, when the gap g between the stator 110 and the rotor 120 is 0.5 mm, $221 \leq \Phi r/g^2 \leq 230$ is satisfied; when the gap g between the stator 110 and the rotor 120 is 0.51 mm, $212 \leq \Phi r/g^2 \leq 221$ is satisfied; when the gap g between the stator 110 and the rotor 120 is 0.52 mm, $204 \leq \Phi r/g^2 \leq 212$ is satisfied; when the gap g between the stator 110 and the rotor 120 is 0.53 mm, $200 \leq \Phi r/g^2 \leq 204$ is satisfied; when the gap g between the stator 110 and the rotor 120 is 0.54 mm, $190 \leq \Phi r/g^2 \leq 200$ is satisfied; and when the gap g between the stator 110 and the rotor 120 is 0.55 mm, $180 \leq \Phi r/g^2 \leq 190$ is satisfied.

The unit of the outer diameter $\Phi r$ of the rotor is millimeter, and the unit of the gap g between the stator and the rotor is millimeter. g refers to any gap between the stator and the rotor or represents a minimum gap between the two.

Further, the gap g between the stator 110 and the rotor 120 is negatively correlated with $\Phi r/g^2$. The larger the gap g between the stator 110 and the rotor 120, the smaller the $\Phi r/g^2$.

Embodiment 3

On the basis of any one of the above-described embodiments, the gap g between the stator 110 and the rotor 120 is further defined to satisfy: 0.5 mm≤g≤0.55 mm. On one hand, it is favorable for the stable rotation of the rotor 120 in the stator 110 without collision; and on the other hand, it is favorable for the rotor 120 to have sufficient size and weight, so that the problem of loud vibration noise of the shaft system caused by the small mass of the rotor 120 can be avoided, and the running noise of the motor 100 and the compressor 200 is reduced. In a case where the inner diameter $\Phi si$ of the stator 110 and the outer diameter $\Phi so$ of the stator 110 satisfy: $0.558 \leq \Phi si/\Phi so \leq 0.576$, and/or the gap g between the stator 110 and the rotor 120 and the outer diameter $\Phi r$ of the rotor 120 satisfy: $180 \leq \Phi r/g^2 \leq 240$, and/or the rotational inertia J of the rotor 120, the gap g between the stator 110 and the rotor 120, the mass m of the rotor 120 and the outer diameter $\Phi r$ of the rotor 120 satisfy: $230 \leq J/g^2 \leq 340$, and $J=0.5 \ m \times \Phi r^2$, and the motor performance can be ensured, the weight of the rotor 120 can be increased better, thereby reducing the vibration noise of the motor 100.

Embodiment 4

On the basis of any one of the above embodiments, as shown in FIG. 1, the rotational inertia J of the rotor 120, the gap g between the stator 110 and the rotor 120, the mass m of the rotor 120 and the outer diameter $\Phi r$ of the rotor 120 further satisfy: $230 \leq J/g^2 \leq 340$, and $J=0.5 \ m \times \Phi r^2$.

In the present embodiment, by enabling the ratio of the rotational inertia J of the rotor 120 to the square of the gap g between the stator 110 and the rotor 120 to be between 230 and 340, and defining that the rotational inertia J of the rotor 120 is equal to 0.5 times the mass of the rotor 120 multiplied by the square of the outer diameter $\Phi r$ of the rotor 120, the mass m of the rotor 120 is defined further by the relation between the rotational inertia and the gap g between the stator 110 and the rotor 120. The mass of the rotor 120 may be the mass of a rotor core 121 after all permanent magnets 122 are inserted. The rotational inertia J of the rotor 120, the gap g between the stator 110 and the rotor 120, the mass m of the rotor 120 and the outer diameter Φr of the rotor 120 are interrelated, and the value range of combined variables is $230 \leq J/g^2 \leq 340$, so that the mass of the rotor 120 can be increased, the running noise of the compressor 200 can be reduced, the running efficiency of the motor 100 can be improved, and the performance of the motor 100 can be ensured. According to certain embodiments, $J/g^2$ is 280, 320 or 340. The unit of the rotational inertia J of the rotor 120 is kg·m².

According to certain embodiments, when the gap g between the stator 110 and the rotor 120 is 0.5 mm, $288 \leq J/g^2 \leq 340$ is satisfied; when the gap g between the stator 110 and the rotor 120 is 0.51 mm, $277 \leq J/g^2 \leq 318$ is satisfied; when the gap g between the stator 110 and the rotor 120 is 0.52 mm, $266 \leq J/g^2 \leq 306$ is satisfied; when the gap g between the stator 110 and the rotor 120 is 0.53 mm, $256 \leq J/g^2 \leq 294$ is satisfied; when the gap g between the stator 110 and the rotor 120 is 0.54 mm, $247 \leq J/g^2 \leq 284$ is satisfied; when the gap g between the stator 110 and the rotor 120 is 0.55 mm, $230 \leq J/g^2 \leq 273$ is satisfied.

Further, the gap g between the stator 110 and the rotor 120 is negatively correlated with $J/g^2$. The larger the gap g between the stator 110 and the rotor 120, the smaller the $J/g^2$.

Embodiment 5

On the basis of any one of the above embodiments, as shown in FIG. 2 and FIG. 3, a plurality of slots 123 are further defined as being distributed circumferentially around the rotation center line of the rotor 120, a connecting line between the midpoint of each slot 123 and the rotation center line of the rotor 120 is a d axis, and the d axis is a straight line; and two permanent magnets 122 distributed at two sides of the d axis are arranged in each slot 123, and the two permanent magnets 122 are distributed in a V shape.

In the present embodiment, the plurality of slots 123 are arranged circumferentially around the rotation center line of the rotor 120, so that the plurality of permanent magnets 122 are also distributed circumferentially around the rotation center line of the rotor 120, which is conducive to ensuring the running stability of the motor 100. Furthermore, the connecting line between the midpoint of each slot 123 and the rotation center line of the rotor 120 is the d axis, and the d axis is the straight line and the connecting line representing a distance between the midpoint and the rotation center line of the rotor 120. The midpoint is located on an axisymmetric plane of the slot 123. Two permanent magnets 122 are arranged in each slot 123, the two permanent magnets 122 are distributed at two sides of the d axis and distributed in a V shape, that is, in any cross section of the rotor 120, extension lines of long sides of the two permanent magnets 122 are not overlapped but intersected at one point, which is conducive to increasing a back electromagnetic force of the motor 100, improving the harmonics of the air-gap magnetic field and reducing the noise generated thereby.

Further, an angle of the two permanent magnets 122 is ranged from 110° to 150°. That is, on any cross section of the rotor 120, portions of each slot 123 at two sides of the d axis form an angle between 110° and 150°, the harmonics of the air-gap magnetic field are stable, the noise reduction effect is good, the back electromagnetic force is high, a cooperation effect with tooth crowns of stator teeth 112 on the stator 110 is good, and the performance of the motor 100 is good. According to certain embodiments, the angle of the two permanent magnets 122 is 110°, 130° or 150°.

Figure 6:
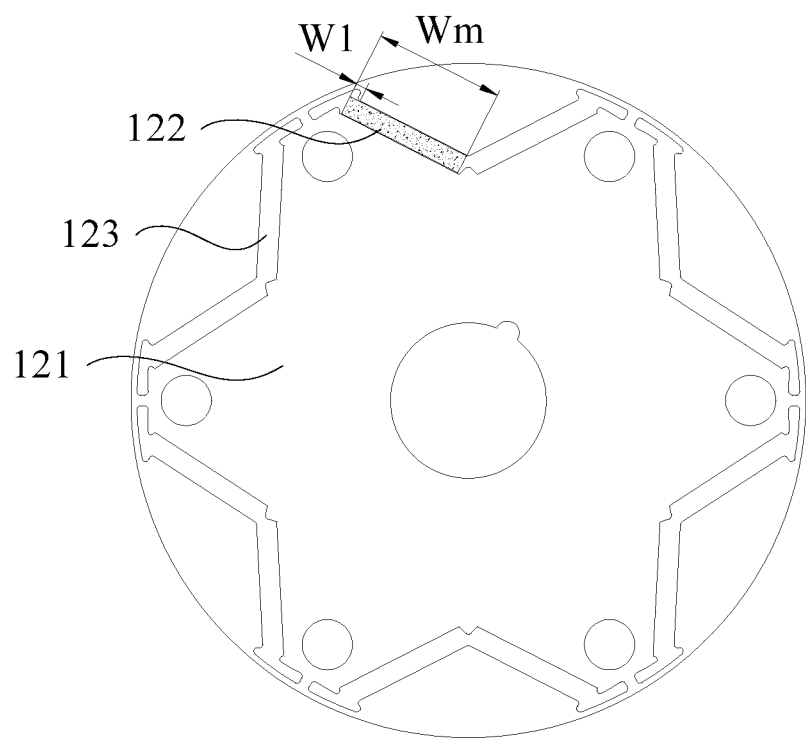
FIG. 6 illustrates another structural schematic diagram of the rotor of an embodiment of the present disclosure.
Figure 11:
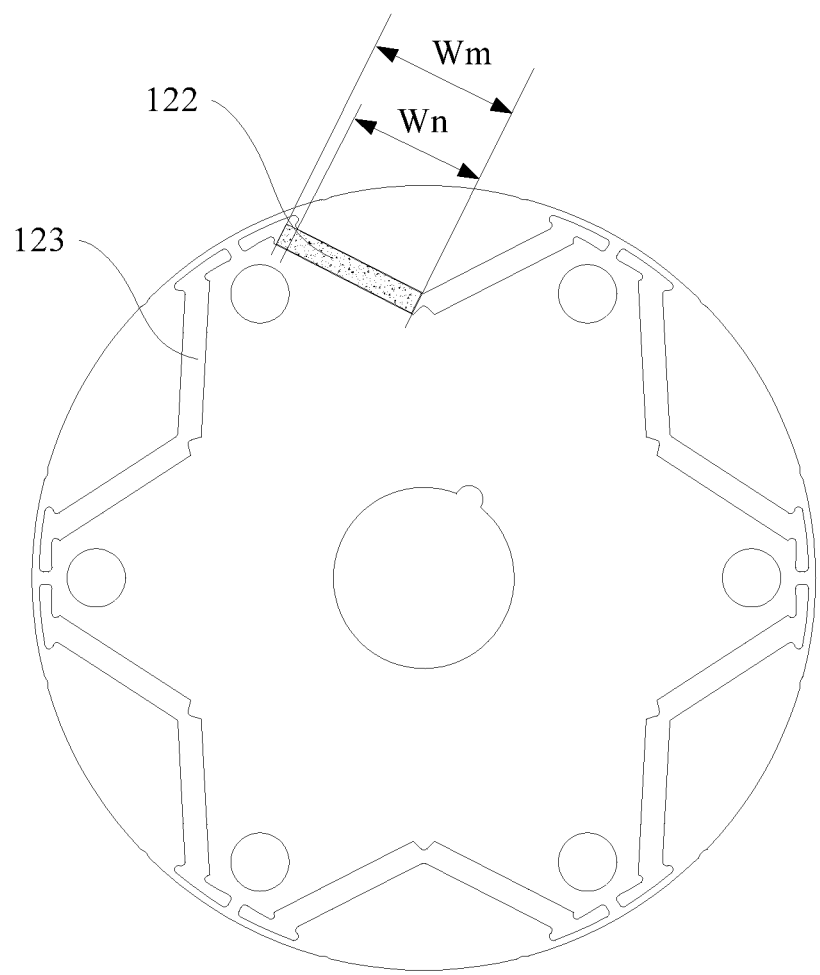
FIG. 11 illustrates another structural schematic diagram of the rotor of an embodiment of the present disclosure.

Further, as shown in FIG. 2, FIG. 6 and FIG. 11, on any cross section of the rotor 120, a length of a slot wall of a half slot 123 divided by the d axis is Wn, a length of the permanent magnet 122 is Wm, and a difference between Wm and Wn is denoted as W1, wherein $0<W1/Wm \leq 0.5$. The power density of the motor 100 is increased. Wn here is the length of the slot wall fit to the permanent magnet 122 by default. In order to ensure that the permanent magnet 122 is arranged in the slot 123, the slot side wall is partially missing, such as recessed or protruded and is not fit to the permanent magnet 122, so that the permanent magnet 122 is inserted into the slot 123.

Figure 12:
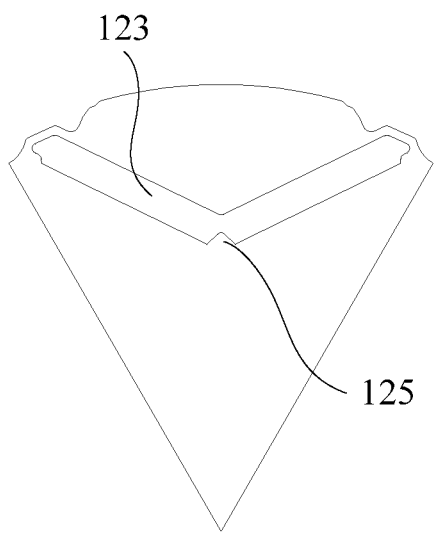
FIG. 12 illustrates a local structural diagram of the rotor of an embodiment of the present disclosure.
Figure 13:
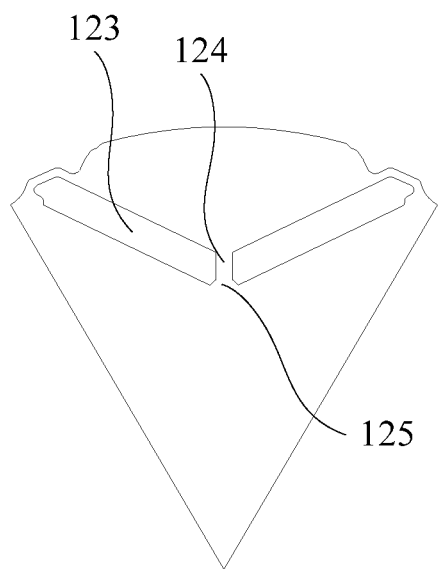
FIG. 13 illustrates another local structural diagram of the rotor of an embodiment of the present disclosure.

Further, as shown in FIG. 12 and FIG. 13, each slot 123 is provided with a retaining rib 124 on the position of the d axis, the slot 123 is divided by the retaining rib 124 into two independent chambers; and/or each slot 123 is provided with a clamping bulge 125 on the position of the d axis, the clamping bulge 125 extends into the slot 123 and extends in a direction away from the rotation center line of the rotor 120. By arranging the retaining rib 124, the alignment and installation of the permanent magnets 122 are facilitated. By arranging the clamping bulge 125, the position of the permanent magnet 122 is limited by the clamping bulge 125, so that the permanent magnet 122 is ensured to be installed in place. At the same time, the mechanical strength of the rotor 120 can be improved by the retaining ribs 124 to prevent the plastic deformation of the punches of the rotor 120 when the motor 100 rotates at high speed.

Figure 14:
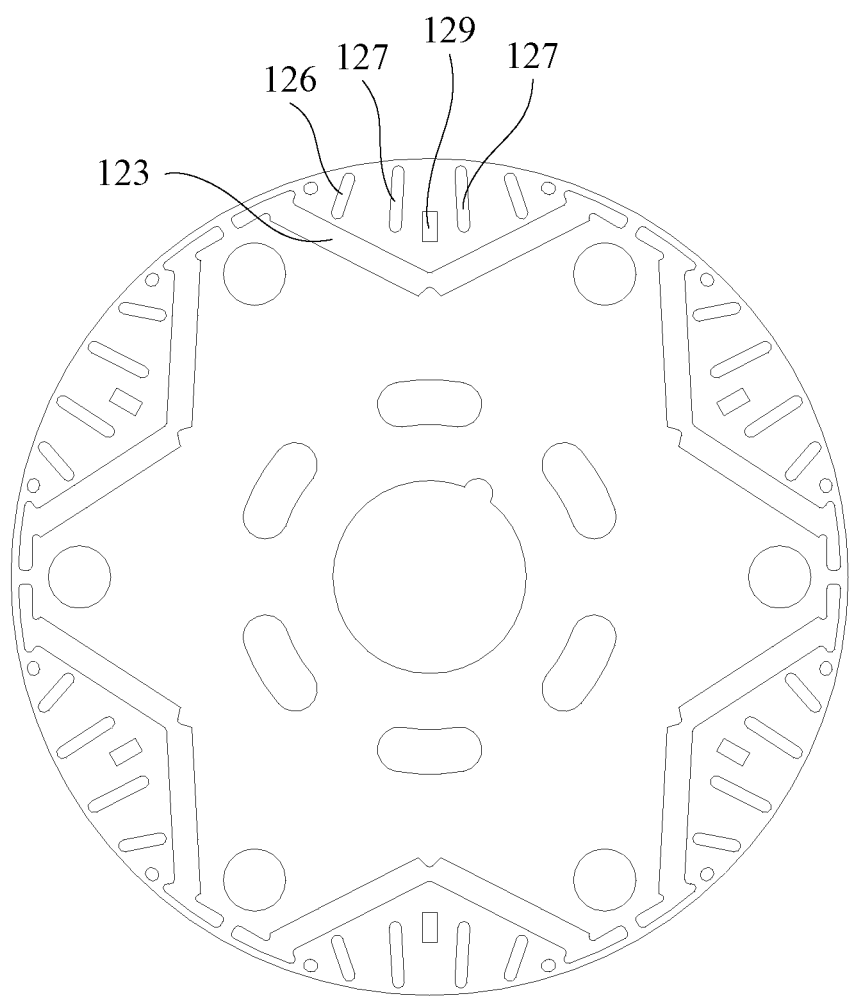
FIG. 14 illustrates another structural schematic diagram of the rotor of an embodiment of the present disclosure.

Further, as shown in FIG. 14, on any cross section of the rotor 120, a riveting hole 129 connecting the punches of the rotor 120 is provided between the magnetic flux guide grooves located at two sides of the d axis, so that the punches of the rotor 120 are riveted.

Embodiment 6

On the basis of any one of the above embodiments, the rotor 120 further defines a plurality of magnetic flux guide grooves. On any cross section of the rotor 120, the plurality of magnetic flux guide grooves are located between the plurality of slots 123 and the peripheral wall of the rotor core 121.

In the present embodiment, the rotor core 121 defines a plurality of magnetic flux guide grooves. For example, on any cross section of the rotor 120, the plurality of magnetic flux guide grooves are arranged between the plurality of slots 123 and the peripheral wall of the rotor core 121, and located between the plurality of permanent magnets 122 and the coils on the stator teeth 112, so that the harmonics magnetic field of an armature magnetic field can be adjusted, the electromagnetic waveforms of the air-gap magnetic field can be improved, the harmonics of the air-gap magnetic field can be optimized, thereby reducing the noise, and reducing the loss of armature iron. The problem in conventional technologies that the loud vibration noise caused by rich harmonics of the air-gap magnetic field affects the audio impression can be avoided, and low-noise guarantee is provided for the design of the motor 100 with higher power density in the industry at present.

Further, the magnetic flux guide grooves pass through the rotor core 121 along an extension direction of the rotation center line of the rotor 120.

Further, on any cross section of the rotor 120, a contour line of each magnetic flux guide groove is enclosed by a plurality of curves and/or a plurality of straight lines. The cross section of the magnetic flux guide groove may be in a rectangular shape, a sector-ring shape or a runway shape.

Figure 9:
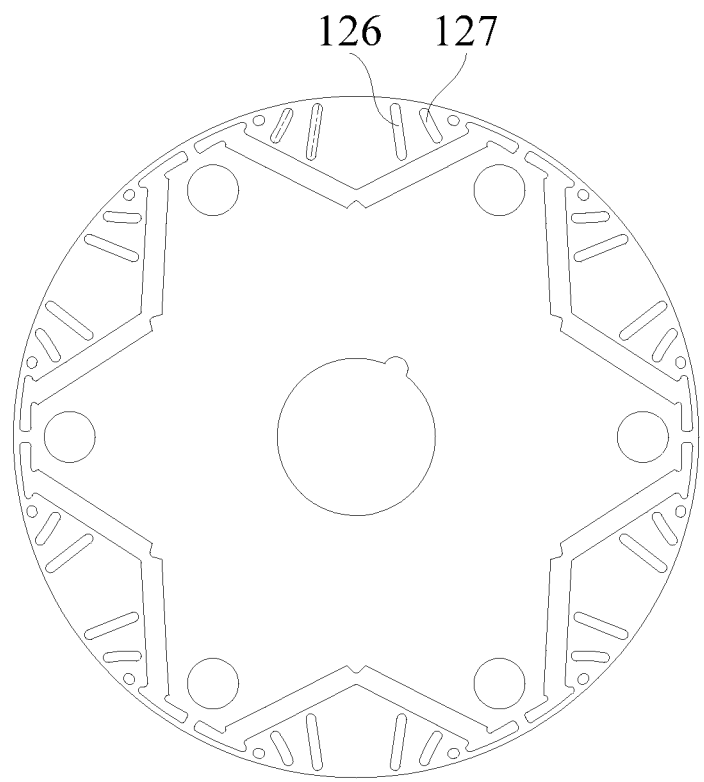
FIG. 9 illustrates another structural schematic diagram of the rotor of an embodiment of the present disclosure.
Figure 10:
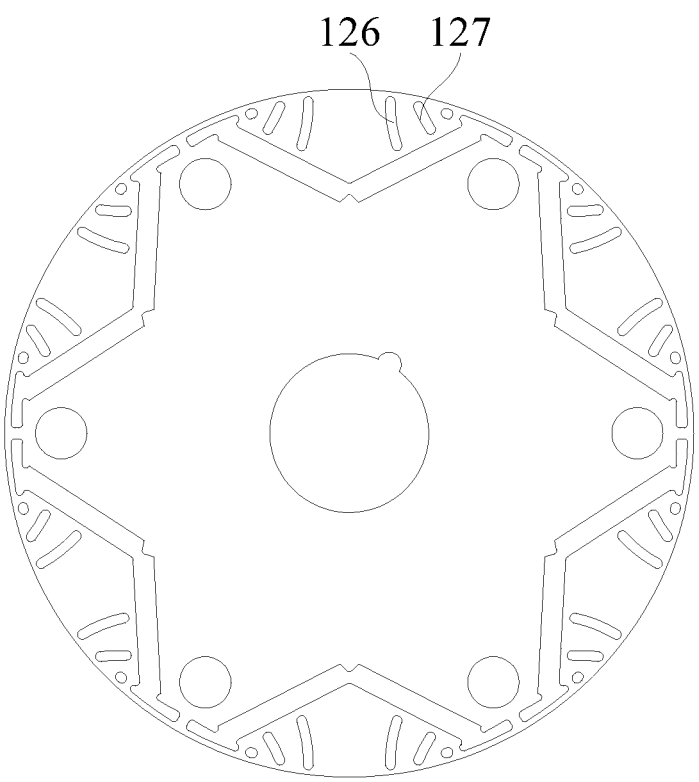
FIG. 10 illustrates another structural schematic diagram of the rotor of an embodiment of the present disclosure.

For example, as shown in FIG. 9, the contour line of the first magnetic flux guide groove 126 is enclosed by the straight line located in the middle portion and curves located at two ends, and the contour line of the second magnetic flux guide groove 127 is enclosed by a plurality of curves. As shown in FIG. 10, the contour line of the first magnetic flux guide groove 126 and the contour line of the second magnetic flux guide groove 127 both are enclosed by a plurality of curves.

Further, as shown in FIG. 3, the plurality of magnetic flux guide grooves are divided into a plurality of groups of guide grooves, and the magnetic flux guide grooves located between one slot 123 and the peripheral wall of the rotor core 121 form one group of guide grooves; and each group of guide grooves includes a first magnetic flux guide groove 126 and a second magnetic flux guide groove 127. In a case where one stator tooth 112 is opposite to the middle portion of one slot 123, a plane where one side wall in a width direction of the stator tooth 112 is located is used to separate the first magnetic flux guide groove 126 and the second magnetic flux guide groove 127. Each group of guide grooves includes at least two magnetic flux guide grooves, for example, includes the first magnetic flux guide groove 126 and the second magnetic flux guide groove 127, so that the electromagnetic waves of the armature magnetic field can be adjusted effectively, thereby improving the electromagnetic waveforms of the air-gap magnetic field, reducing the noise, and reducing the loss of the iron core. Of course, in other designs, each group of guide grooves may also include a third magnetic flux guide groove.

Furthermore, in a case where the stator tooth 112 is opposite to the middle portion of one slot 123, that is, in a case where the stator tooth 112 rotates to be right opposite to the middle portion of the slot 123, or the stator tooth 112 is right opposite to the middle portion of the slot 123 after stopping rotating, the plane where one side wall in the width direction of the stator tooth 112 is located can separate the first magnetic flux guide groove 126 and the second magnetic flux guide groove 127, so that on one hand, it can be ensured that a certain distance is provided between the first magnetic flux guide groove 126 and the second magnetic flux guide groove 127, thereby facilitating the machining of the magnetic flux guide groove and avoiding the deformation of the rotor punches; and on the other hand, after the coil on the stator tooth 112 is electrified, the effect for weakening the harmonics magnetic field acting on the rotor 120 is better, so that the running efficiency of the motor 100 is improved, and the noise reduction effect is improved. For example, in a case where each group of guide grooves includes two first magnetic flux guide grooves 126 and two second magnetic flux guide grooves 127, the planes where both side surfaces in the width direction of the stator tooth 112 are located can separate the first magnetic flux guide grooves 126 and the second magnetic flux guide grooves 127, and then the two second magnetic flux guide grooves 127 are located between the two first magnetic flux guide grooves 126, so that two second magnetic flux guide grooves 127 with complete contours are clamped between the planes where the two side surfaces in the width direction of the stator tooth 112 are located.

Further, on any cross section of the rotor 120, the width of the magnetic flux guide groove is changed in the radial direction of the rotor core 121; and/or on any cross section of the rotor 120, the widths of the first magnetic flux guide groove 126 and the second magnetic flux guide groove 127 are different at equal distances from the rotation center line of the rotor 120.

The penetration depth of the armature magnetic field on the surface of the rotor 120 may be different, which is more conducive to weakening the armature magnetic field, so that the air-gap magnetic field is more stable, and the noise is reduced.

Further, in each group of guide grooves, the number of first magnetic flux guide grooves 126 is two, and the number of second magnetic flux guide grooves 127 is two; and the two first magnetic flux guide grooves 126 are located between the two second magnetic flux guide grooves 127. The fundamental amplitude of the back electromagnetic force can be increased, the copper loss can be reduced, the sinusoidal degree of the waveform of the air-gap magnetic field is better, and the noise is reduced; and moreover, it is conducive to weakening the armature magnetic field, and reducing the iron loss.

Embodiment 7

On the basis of Embodiment 6, on any cross section of the rotor 120, a connecting line between midpoints of two ends in the length direction of the magnetic flux guide groove is a directional line of the magnetic flux guide groove, and the directional line is a straight line. An extension line of the directional line of the first magnetic flux guide groove 126 and an extension line of the directional line of the second magnetic flux guide groove 127 have an intersection point, and the intersection point deviates from the d axis at the slot corresponding to the group of guide grooves. The electromagnetic waves of the armature magnetic field can be inhibited effectively, thereby improving the electromagnetic waveforms of the air-gap magnetic field, reducing the noise, and reducing the iron loss.

Figure 4:
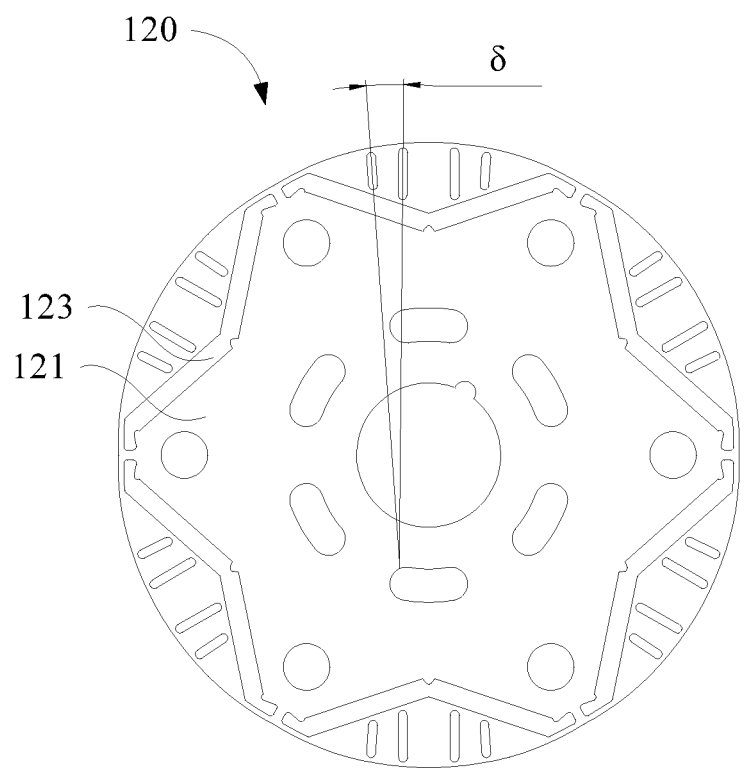
FIG. 4 illustrates a structural schematic diagram of a rotor of an embodiment of the present disclosure.
Figure 5:
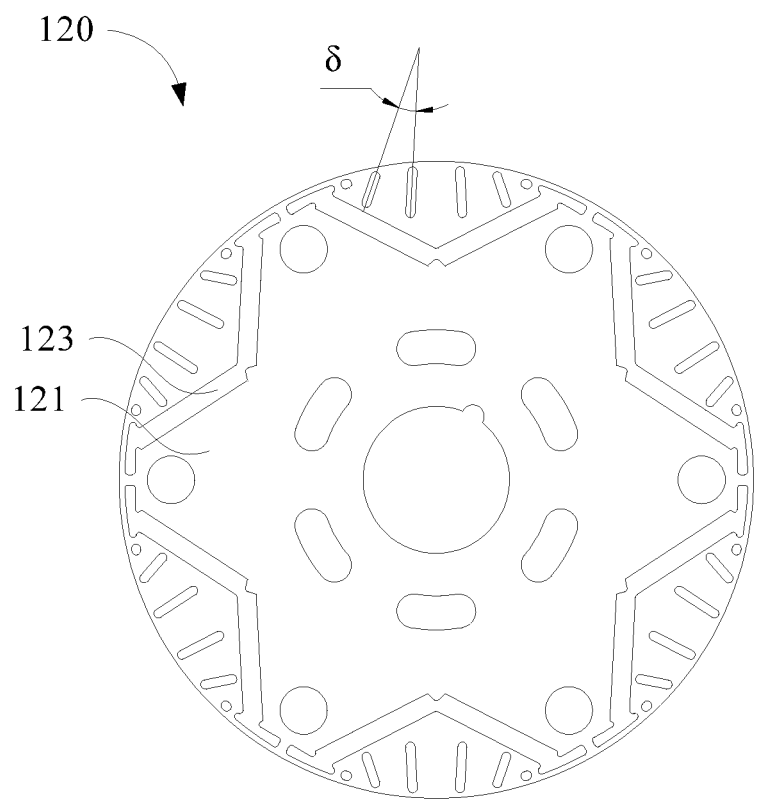
FIG. 5 illustrates another structural schematic diagram of the rotor of an embodiment of the present disclosure.

Further, as shown in FIG. 4 and FIG. 5, on any cross section of the rotor 120, the extension line of the directional line of the first magnetic flux guide groove 126 and the extension line of the directional line of the second magnetic flux guide groove 127 form an angle $\delta$, and $\delta$ is an acute angle and according to certain embodiments $3°<\delta\leq20°$. The harmonics of the armature magnetic field can be inhibited effectively, thereby improving the electromagnetic waveforms of the air-gap magnetic field, and reducing the noise. According to certain embodiments, $\delta$ is 5°, 12° or 20°.

Figure 8:
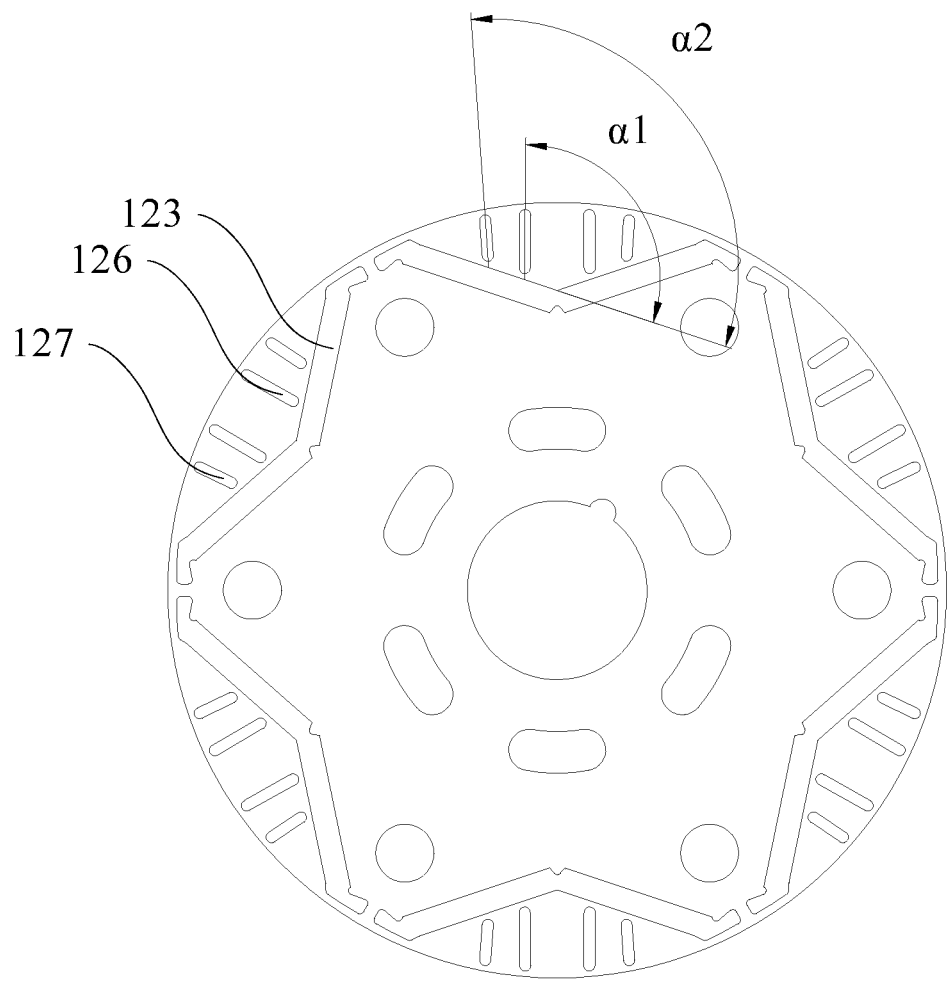
FIG. 8 illustrates another structural schematic diagram of the rotor of an embodiment of the present disclosure.

Further, as shown in FIG. 8, on any cross section of the rotor 120, an angle $\alpha1$ between the contour line of the slot 123 facing the first magnetic flux guide groove 126 and the directional line of the first magnetic flux guide groove 126 and an angle $\alpha2$ between the contour line of the slot 123 facing the second magnetic flux guide groove 127 and the directional line of the second magnetic flux guide groove 127 satisfy: a sum of the angle $\alpha1$ and the angle $\alpha2$ is greater than 180°. The effective value of the back electromagnetic force can be maximized, the copper loss may be reduced, the harmonics of the armature magnetic field can be inhibited, the electromagnetic waveforms of the air-gap magnetic field can be improved, the noise can be reduced, and the iron loss can be reduced. According to certain embodiments, the sum of $\alpha1$ and $\alpha2$ is 200° or 250°.

Further, when $1<\alpha2/\alpha1\leq1.1$, the armature iron loss can be inhibited, the waveforms of the air-gap magnetic field can be improved, the running noise of the compressor 200 can be reduced effectively, and the low and medium frequency energy efficiency of the compressor 200 can be improved. According to certain embodiments, $\alpha2/\alpha1$ is 1.01, 1.05 or 1.1.

According to certain embodiments, when $90°<\alpha1\leq120°$, the waveforms of the air-gap magnetic field can be improved, the armature iron loss can be reduced effectively, and the low and medium frequency energy efficiency of the compressor 200 can be improved. According to certain embodiments, α1 is 100°, 110° or 120°.

According to certain embodiments, when 90°<α2≤130°, the armature iron loss can be inhibited, the back electromagnetic force can be increased, and the low-frequency energy efficiency of the compressor 200 can be increased. According to certain embodiments, α2 is 110°, 120° or 125°.

Figure 7:
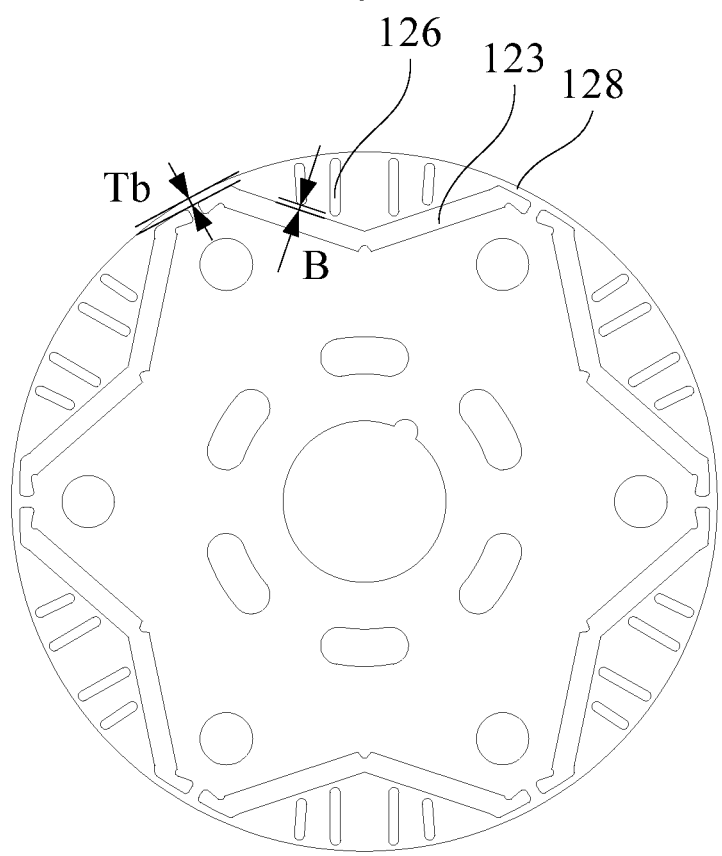
FIG. 7 illustrates another structural schematic diagram of the rotor of an embodiment of the present disclosure.

Further, as shown in FIG. 7, on any cross section of the rotor 120, a magnetic isolation bridge 128 is formed between the end of at least one slot 123 far from the rotation center line of the rotor 120 and the peripheral wall of the rotor core 121. The distance B between the magnetic flux guide groove and the slot 123 and the thickness Tb of the magnetic isolation bridge 128 satisfy: B<Tb. Therefore, while the magnetic flux is maximized, the armature action is inhibited, and the running efficiency of the motor 100 is increased. The end of the slot 123 away from the rotation center line of the rotor 120 forms a non-magnetic gap, and the magnetic isolation bridge 128 is located at one side of the gap away from the d axis of the slot 123. Tb refers to the thickness of any position of the magnetic isolation bridge 128, or Tb refers to a minimum thickness of the magnetic isolation bridge 128.

Embodiment 8

On the basis of any one of the above embodiments, a rated torque T of the motor 10, the inner diameter Φsi of the stator 110 and a torque per unit volume TPV of the rotor 120 satisfy: $5.18 \times 10^{-7} \leq T \times \Phi si^{-3} \times TPV^{-1} \leq 1.17 \times 10^{-6}$, and 5 kN·m·m$^{-3}$ ≤ TPV ≤ 45 kN·m·m$^{-3}$, wherein the unit of the rated torque T is N·m, the unit of the inner diameter Φsi is mm, and the unit of the torque per unit volume TPV is kN·m·m$^{-3}$.

In the present embodiment, the motor 100 also includes a stator 110, and the stator 110 is arranged around the outer side of the rotor 120; the rated torque T of the motor 100, the inner diameter Φsi of the stator 110 and the torque per volume TPV of the rotor 120 satisfy: $5.18 \times 10^{-7} \leq T \times Di^{-3} \times TPV^{-1} \leq 1.17 \times 10^{-6}$, and a value range of the torque per unit volume TPV is 5 kN·m·m$^{-3}$ ≤ TPV ≤ 45 kN·m·m$^{-3}$; by defining the value range of the combined variables of the rated torque T of the motor 100, the inner diameter Φsi of the stator 110 and the torque per unit volume TPV of the rotor 120, the motor 100 can meet the power requirement of the compressor 200; and furthermore, for the motor 100 and the compressor 200 including the rotor 120, the magnetic leakage of the rotor 120 can be reduced effectively, the utilization rate of the permanent magnets 122 can be increased, and the efficiency of the motor 100 can be improved.

Further, the number of the stator grooves 113 is Z, the number of pole pairs of the rotor 120 is P, and Z/2 P=3/2, 6/5, 6/7, 9/8 or 9/10.

In the present embodiment, by limiting a proportion of the number Z of the stator grooves 113 and the number P of the pole pairs of the rotor 120, the cooperation between poles and slots of the motor 100 is defined; when the number of pole pairs of the rotor 120 is P, the number of poles of the rotor 120 is 2 P, that is, the motor 100 may be a motor 100 with 6 poles and 9 slots, a motor 100 with 4 poles and 6 slots, a motor 100 with 8 poles and 12 slots and a motor 100 with 10 poles and 12 slots. The motor 100 of the above type can reduce the magnetic leakage of the rotor 120 effectively, and improve the magnetic flux, thereby improving the efficiency of the motor 100.

Figure 18:
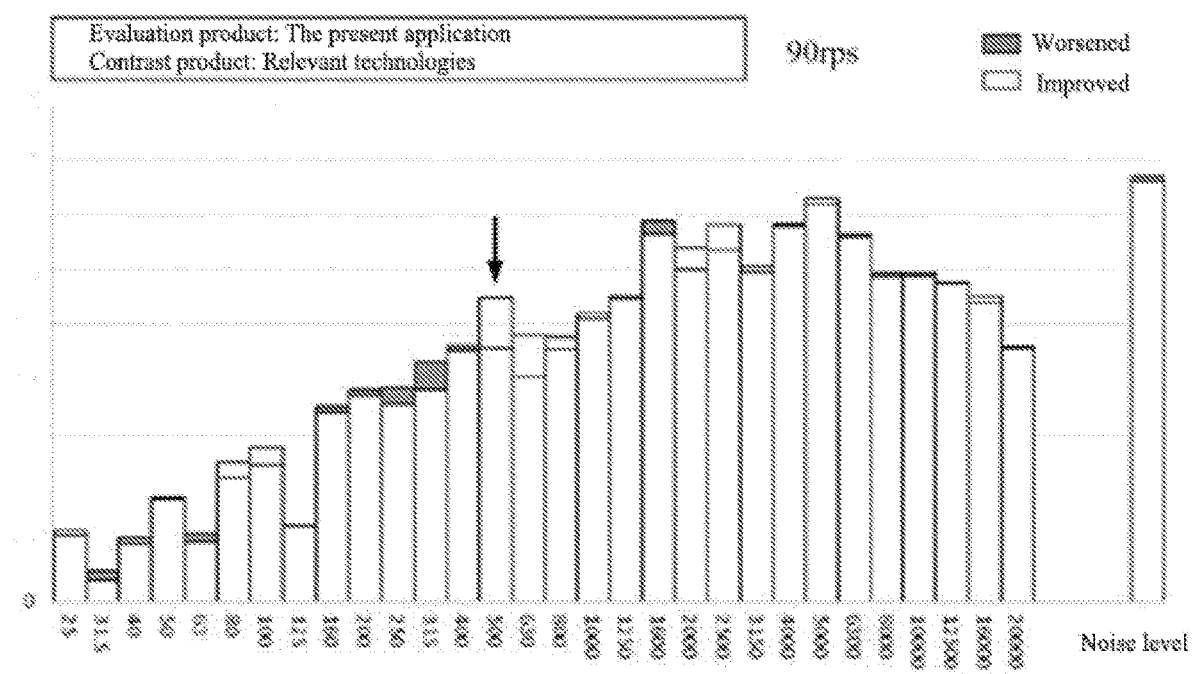
FIG. 18 illustrates a contrast diagram of running noise of the compressor of an embodiment of the present disclosure and the running noise of the compressor in conventional technologies.

In conclusion, as shown in FIG. 18, the compressor 200 adopting the motor 100 of Embodiment 1 to Embodiment 7 is compared with a compressor in conventional technologies, in a case where the compressor 200 runs at 90 rps (turns/second), the noise at the frequency band of 500 HZ is improved significantly.

Figure 15:
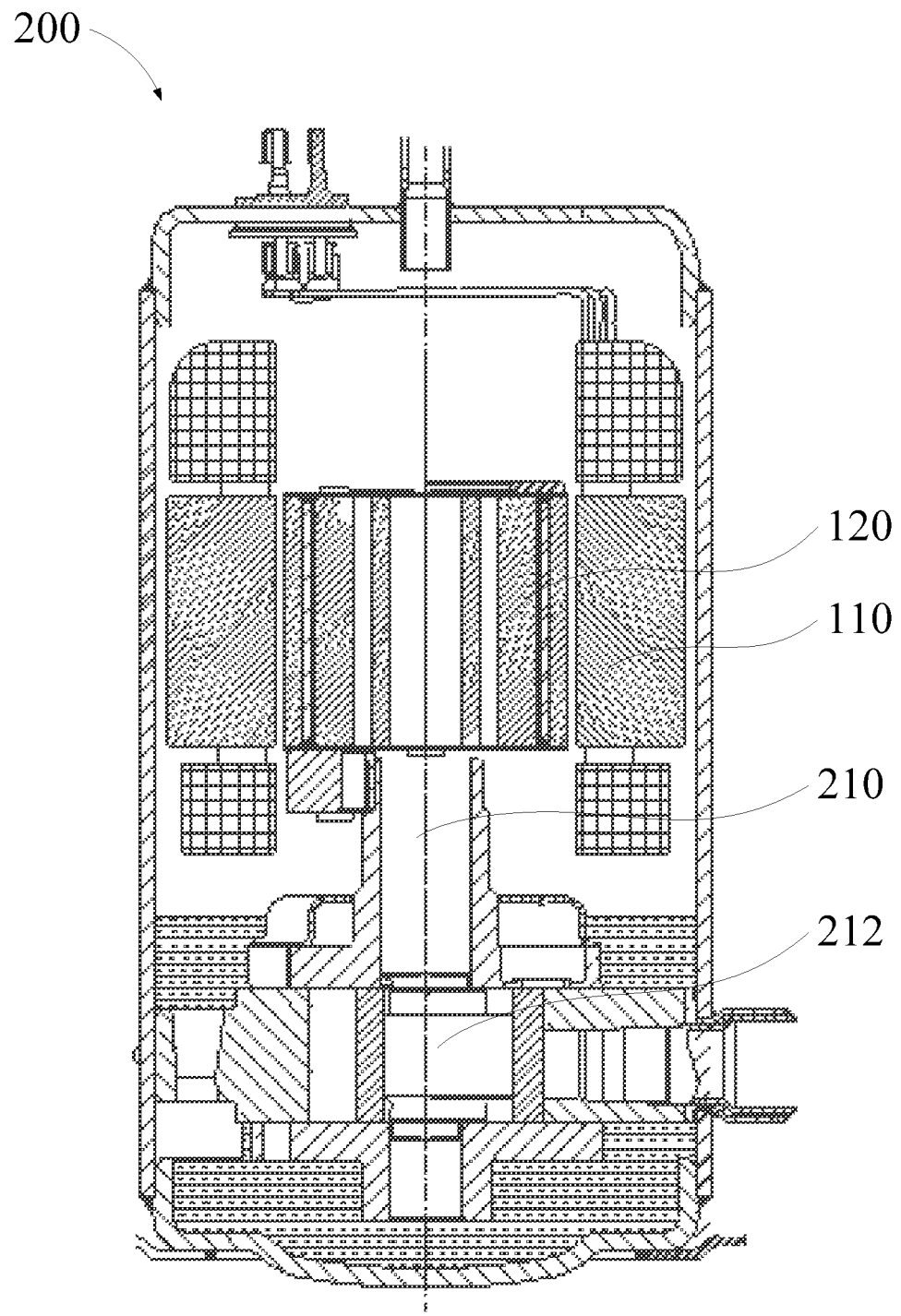
FIG. 15 illustrates a structural schematic diagram of a compressor of an embodiment of the present disclosure.
Figure 16:
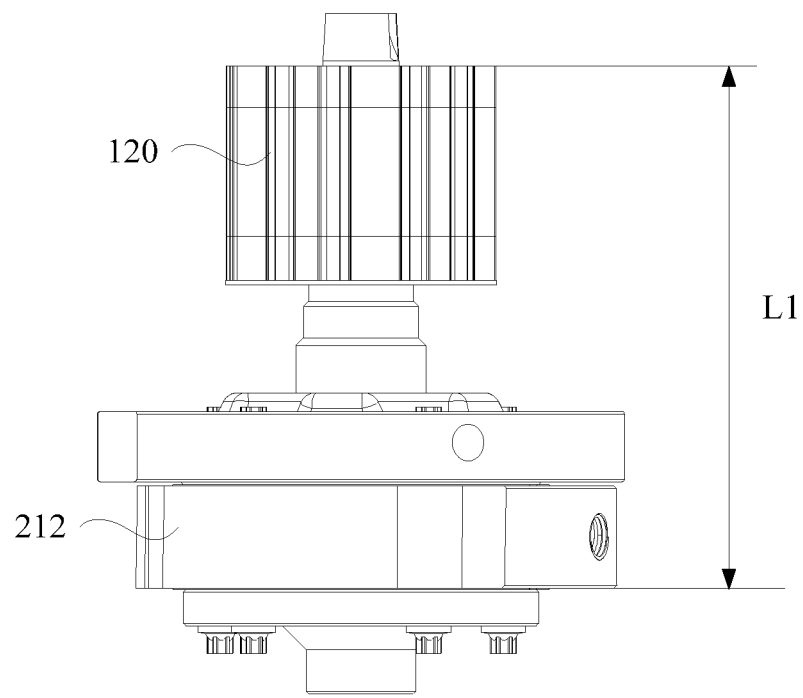
FIG. 16 illustrates a local structural diagram of the compressor of an embodiment of the present disclosure.
Figure 17:
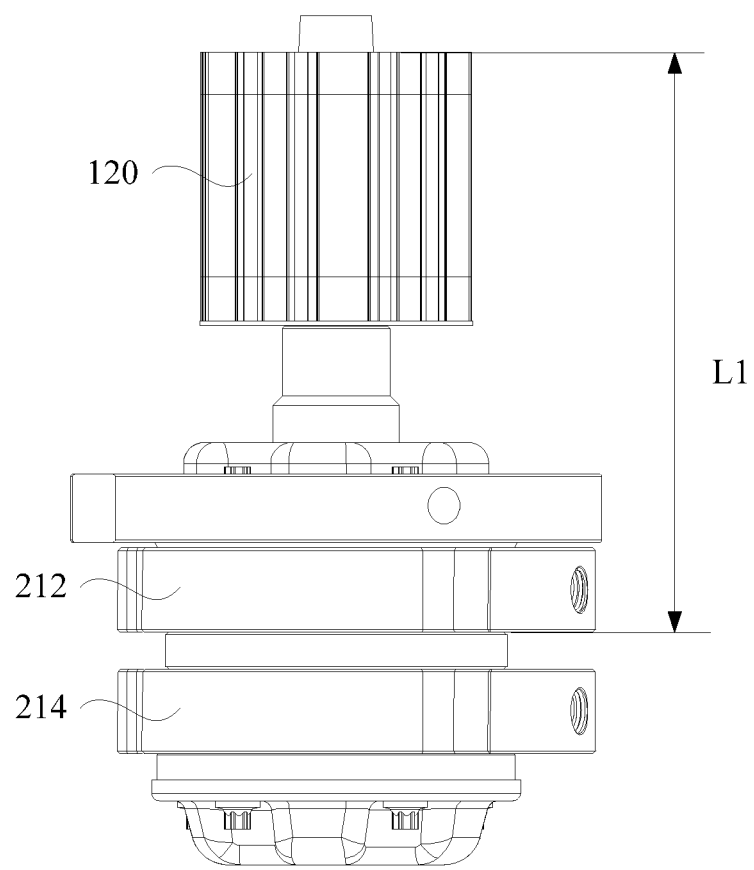
FIG. 17 illustrates another local structural diagram of the compressor of an embodiment of the present disclosure.

As shown in FIG. 15 to FIG. 17, according to the second aspect of the present disclosure, an embodiment provides a compressor 200, exemplary examples of which are as follows.

Embodiment 1

As shown in FIG. 15, a compressor 200 includes a crankshaft 210, a first air cylinder 212, and the motor 100 of any one of the above embodiments, wherein the rotor 120 of the motor 100 is sleeved on the crankshaft 210, and the air cylinder is located at one side of the rotor 120. The compressor 200 provided by the present disclosure is provided with the motor 100 of any one of the above embodiments, thereby having the beneficial effects of any one of the above embodiments, which are not repeated here.

Embodiment 2

On the basis of the embodiment 1, as shown in FIG. 16, a distance L1 between the end surface of the first air cylinder 212 away from the rotor 120 and the end surface of the rotor core 121 away from the first air cylinder 212 and the outer diameter Φr of the rotor 120 satisfy: 1.91≤L1/Φr≤2.11.

In the present embodiment, by setting a ratio of the distance L1 between the end surface of the first air cylinder 212 away from the rotor 120 and the end surface of the rotor core 121 away from the first air cylinder 212 to the outer diameter Φr of the rotor 120 to be 1.91-2.11, the shaft system of the compressor 200 can reach proper stiffness, so that the running stability of the shaft system of the compressor 200 is improved, thereby reducing the running noise. The shaft system of the compressor 200 includes the rotor 120, the crankshaft 210 and the air cylinder of the compressor 200. According to certain embodiments, L1/Φr is 1.93, 1.95 or 2.10.

Further, the distance L1 between the end surface of the first air cylinder 212 away from the rotor 120 and the end surface of the rotor core 121 away from the first air cylinder 212, the inner diameter Φsi of the stator 110 and the outer diameter Φso of the stator 110 satisfy: 191≤L1/(Φsi/Φso) ≤211. The shaft system of the compressor 200 can reach proper stiffness, and the running stability of the shaft system of the compressor 200 can be improved, thereby reducing the running noise. Particularly in a case where the distance L1 is also related to the outer diameter Φso of the rotor 120, and satisfies: 1.91≤L1/Φr≤2.11, not only can the rotor 120 have large size and heavy weight, but also the stiffness of the shaft system of the compressor 200 can be improved, and the running noise of the compressor 200 can be reduced effectively. According to certain embodiments, L1/(Φsi/Φso) is 192, 200 or 210.

Further, the inner diameter Φr of a portion of the rotor 120 matched with the crankshaft 210 and the outer diameter Φr of the rotor 120 satisfy: 3.8≤Φr/Φ1≤4.5. The frictional loss of the compressor 200 in the running process can be reduced effectively, the outer diameter of the rotor 120 is small, the inner diameter Φ1 of the portion of the rotor 120 matched with the crankshaft 210 is small, and the diameter of the crankshaft 210 located in the rotor 120 is small, thereby facilitating the reduction of the frictional loss, and ensuring the running reliability of the motor 100. According to certain embodiments, Φr/Φ1 is 3.8, 4.0 or 4.5. Tolerance is ignored here. The diameter of the portion of the crankshaft 210 of the compressor 200 matched with the rotor 120 is same with Φ1 by default.

Φ1 refers to the inner diameter of any portion of the rotor 120 matched with the crankshaft 210, or the maximum inner diameter of the portion of the rotor 120 matched with the crankshaft 210.

Embodiment 3

On the basis of the embodiment 1, as shown in FIG. 17, the compressor 200 is further defined to include a second air cylinder 214 located at one side of the first air cylinder 212 away from the rotor 120. The inner diameter Φr of the portion of the rotor 120 matched with the crankshaft 210 and the outer diameter Φr of the rotor 120 satisfy: $3.4 \leq \Phi r/\Phi 1 \leq 4$.

In the present embodiment, in a case where the compressor 200 is provided with two air cylinders, the ratio of the outer diameter Φ of the rotor 120 to the inner diameter Φ1 of the portion of the rotor 120 matched with the crankshaft 210 is between 3.4 and 4, so that the frictional loss of the compressor 200 in the running process can be reduced effectively, the outer diameter of the rotor 120 is small, but the inner diameter Φ1 of the portion of the rotor 120 matched with the crankshaft 210 may not be too small, and the diameter of the crankshaft 210 located in the rotor 120 may not be too small either, thereby reducing the frictional loss, and ensuring the running reliability of the motor 100. According to certain embodiments, Φr/Φ1 is 3.4, 3.8 or 4. Tolerance is ignored here. The diameter of the portion of the crankshaft 210 of the compressor 200 matched with the rotor 120 is the same with Φ1 by default.

Φ1 refers to the inner diameter of any portion of the rotor 120 matched with the crankshaft 210, or the maximum inner diameter of the portion of the rotor 120 matched with the crankshaft 210.

Then, as shown in FIG. 17, the distance L1 between the end surface of the first air cylinder 212 away from the rotor 120 and the end surface of the rotor core 121 away from the first air cylinder 212 and the outer diameter Φr of the rotor 120 can still satisfy: $1.91 \leq L1/\Phi r \leq 2.11$.

According to the third aspect of the present disclosure, an embodiment provides refrigeration device, which includes the compressor 200 of any one of the above embodiments. The refrigeration device provided by the present disclosure is provided with the compressor 200 of any one of the above embodiments, thereby having the beneficial effects of any one of the above embodiments, which are not repeated here.

Further, the refrigeration device also includes a condenser (not shown), a depressurization member (not shown) and an evaporator (not shown). An outlet of the compressor 200 is communicated with an inlet of the condenser; an inlet of the depressurization member is communicated with an outlet of the condenser; and an inlet of the evaporator is communicated with an outlet of the depressurization member, and an outlet of the evaporator is communicated with an inlet of the compressor 200. The refrigeration and heating cycling is realized. The compressor 200 has long service life, which is conducive to ensuring the service life of the refrigeration system.

Further, the refrigeration device is a refrigerator or an air conditioner.

In the present disclosure, the term "a plurality of" means two or more, unless otherwise specified. Terms such as "installation", "connected", "connecting", "fixation" and the like shall be understood in broad sense, and for example, "connecting" may refer to fixed connection or detachable connection or integral connection, and "connected" may refer to direct connection or indirect connection through an intermediate medium. For those of ordinary skilled in the art, the specific meanings of the above terms in the present disclosure may be understood according to specific conditions.

In the illustration of this description, the illustration of terms of "one embodiment", "some embodiments", "specific embodiments", etc. means that specific features, structures, materials or characteristics illustrated in combination with the embodiment or example are included in at least one embodiment or example of the present disclosure. In this description, exemplary statements for the above terms shall not necessarily refer to the same embodiment or example. Moreover, the described specific features, structures, materials or characteristics can be combined appropriately in any one or more embodiments or examples.

The above only describes preferred embodiments of the present disclosure and is not intended to limit the present disclosure. For those skilled in the art, various variations and changes can be made to the present disclosure. Any modification, equivalent replacement, improvement, etc. made within the spirit and the principle of the present disclosure shall be included within the protection scope of the present disclosure.

What is claimed is:

1. A motor comprising:
a stator comprising a plurality of stator teeth arranged along a peripheral direction, wherein two adjacent stator teeth of the plurality of stator teeth define a stator groove;
a plurality of coil sets, wherein each coil set comprises a plurality of coils wound on the stator teeth, and each coil correspondingly bypasses one corresponding stator tooth; and
a rotor arranged inside the stator, wherein the rotor comprises a rotor core and a plurality of permanent magnets,
wherein the rotor core defines a plurality of slots,
wherein the plurality of slots are distributed circumferentially around a rotation center line of the rotor core,
wherein the plurality of permanent magnets are arranged in the plurality of slots, and
wherein a rotational inertia J of the rotor, a gap g between the stator and the rotor, a mass m of the rotor and an outer diameter Φr of the rotor satisfy:

$180 \leq \Phi r/g^2 \leq 240$, $230 \leq J/g^2 \leq 340$, and $J = 0.5 \ m \times \Phi r^2$.

2. The motor according to claim 1,
wherein a remanence Br of each of the plurality of permanent magnets at 20° C. satisfies: $Br \geq 1.2T$, and
wherein an inner diameter Φsi of the stator and an outer diameter Φso of the stator satisfy: $0.558 \leq \Phi si/\Phi so \leq 0.576$.

3. The motor according to claim 1,
wherein a gap g between the stator and the rotor satisfies: $0.5 \ mm \leq g \leq 0.55 \ mm$.

4. The motor according to claim 1,
wherein the plurality of slots are distributed circumferentially around a rotation center line of the rotor, where a connecting line between a midpoint of each slot of the plurality of slots and the rotation center line of the rotor is a d axis, and where the d axis is a straight line, and wherein two permanent magnets of the plurality of permanent magnets distributed at two sides of the d axis are arranged in two adjacent slots of the plurality of slots, and the two permanent magnets are distributed in a V shape.

5. The motor according to claim 4,
wherein an angle of the two permanent magnets is ranged from 110° to 150°.

6. The motor according to claim 4,
wherein on any cross section of the rotor, a length of a slot wall of a half slot divided by the d axis is Wn, a length of the permanent magnet is Wm, and a difference between Wm and Wn is W1, and
wherein $W_n$, $W_m$ and $W_1$ satisfy: 0<W1/Wm≤0.5.

7. The motor according to claim 4,
wherein the rotor core comprises a retaining rib in each slot of the plurality of slots on a position of the d axis, and each slot of the plurality of slots is divided by the retaining rib into two independent chambers; and/or
wherein the rotor core comprises a clamping bulge in each slot of the plurality of slots on the position of the d axis, and the clamping bulge extends into the each slot and extends in a direction away from the rotation center line of the rotor.

8. The motor according to claim 4,
wherein the rotor defines a plurality of magnetic flux guide grooves, and
wherein on any cross section of the rotor, the plurality of magnetic flux guide grooves are located between the plurality of slots and a peripheral wall of the rotor core.

9. The motor according to claim 8,
wherein on any cross section of the rotor, a contour line of each magnetic flux guide groove of the plurality of magnetic flux guide grooves is enclosed by a plurality of curves and/or a plurality of straight lines.

10. The motor according to claim 8,
wherein the plurality of magnetic flux guide grooves are divided into a plurality of groups of guide grooves, and magnetic flux guide grooves of the plurality of magnetic flux guide grooves located between one slot of the plurality of slots and the peripheral wall of the rotor core form one group of guide grooves of the plurality of groups of guide grooves, and
wherein each group of guide grooves of the plurality of magnetic flux guide grooves comprises a first magnetic flux guide groove and a second magnetic flux guide groove, and
wherein in a case where one stator tooth of the plurality of stator teeth is opposite to the middle portion of one slot of the plurality of slots, a plane where one side wall in the width direction of the stator tooth is located is used to separate the first magnetic flux guide groove and the second magnetic flux guide groove.

11. The motor according to claim 10, wherein:
on any cross section of the rotor, a width of the magnetic flux guide groove is changed in a radial direction of the rotor core; and/or on any cross section of the rotor, the widths of the first magnetic flux guide groove and the second magnetic flux guide groove are different at equal distances from the rotation center line of the rotor.

12. The motor according to claim 10, wherein:
in each group of guide grooves of the plurality of groups of guide grooves, a number of the first magnetic flux guide grooves is two, and a number of the second magnetic flux guide grooves is two and
wherein the two first magnetic flux guide grooves are located between the two second magnetic flux guide grooves.

13. The motor according to claim 10, wherein:
on any cross section of the rotor, a connecting line between midpoints of two ends in a length direction of the magnetic flux guide groove is a directional line of the magnetic flux guide groove, and the directional line is a straight line; and
an extension line of the directional line of the first magnetic flux guide groove and an extension line of the directional line of the second magnetic flux guide groove have an intersection point, and the intersection point deviates from the d axis at the slot corresponding to the group of guide grooves.

14. The motor according to claim 13, wherein on any cross section of the rotor, the extension line of the directional line of the first magnetic flux guide groove and the extension line of the directional line of the second magnetic flux guide groove form an angle δ, and δ satisfies: 3°<δ≤20°.

15. The motor according to claim 10, wherein:
on any cross section of the rotor, an angle α1 between a contour line of the slot facing the first magnetic flux guide groove and the directional line of the first magnetic flux guide groove and an angle α2 between a contour line of the slot facing the second magnetic flux guide groove and the directional line of the second magnetic flux guide groove satisfy:
a sum of the angle α1 and the angle α2 is greater than 180°.

16. The motor according to claim 15, wherein the angle α1 and the angle α2 satisfy: 1<α2/α1≤1.1.

17. The motor according to claim 15, wherein the angle α1 and the angle α2 satisfy: 90°<α1≤120°, and/or 90°<α2<130°.

18. The motor according to claim 10, wherein: on any cross section of the rotor, a magnetic isolation bridge is formed between an end of at least one slot of the plurality of slots away from the rotation center line of the rotor and the peripheral wall of the rotor core, and
a distance B between the magnetic flux guide groove and the slot and a thickness Tb of the magnetic isolation bridge satisfy: B<Tb.

19. A compressor comprising:
a crankshaft;
a first air cylinder; and
the motor of claim 18,
wherein the rotor of the motor is sleeved on the crankshaft, and the first air cylinder is located at one side of the rotor.

20. The compressor according to claim 19, wherein a distance L1 between an end surface of the first air cylinder away from the rotor and an end surface of the rotor core away from the first air cylinder and the outer diameter Φr of the rotor satisfy: 1.91≤L1/Φr≤2.11.

21. The compressor according to claim 19, wherein the distance L1 between the end surface of the first air cylinder away from the rotor and the end surface of the rotor core away from the first air cylinder, an inner diameter Φsi of the stator and an outer diameter Φso of the stator satisfy: 191≤L1/(Φsi/Φso)≤211.

22. The compressor according to claim 19, wherein an inner diameter Φ1 of a portion of the rotor matched with the crankshaft and an outer diameter Φr of the rotor satisfy: 3.8≤Φr/Φ1≤4.5.

23. The compressor according to claim 19, wherein:
the compressor comprises a second air cylinder located at one side of the first air cylinder away from the rotor, and
an inner diameter $\Phi 1$ of a portion of the rotor matched with the crankshaft and the outer diameter $\Phi r$ of the rotor satisfy: $3.4 \leq \Phi r/\Phi 1 \leq 4$.

24. A refrigeration device comprising the compressor of claim 19.

* * * * *